United States Patent
Thomson et al.

(10) Patent No.: US 9,086,883 B2
(45) Date of Patent: Jul. 21, 2015

(54) SYSTEM AND APPARATUS FOR CONSOLIDATED DYNAMIC FREQUENCY/VOLTAGE CONTROL

(75) Inventors: Steven S. Thomson, San Diego, CA (US); Mriganka Mondal, San Diego, CA (US); Nishant Hariharan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 13/344,146

(22) Filed: Jan. 5, 2012

(65) Prior Publication Data

US 2013/0007413 A1    Jan. 3, 2013

Related U.S. Application Data

(60) Provisional application No. 61/495,861, filed on Jun. 10, 2011.

(51) Int. Cl.
| | |
|---|---|
| *G06F 1/32* | (2006.01) |
| *G06F 1/00* | (2006.01) |
| *G06F 1/26* | (2006.01) |
| *G06F 15/16* | (2006.01) |
| *H04L 29/08* | (2006.01) |
| *G06F 9/38* | (2006.01) |

(52) U.S. Cl.
CPC ............ *G06F 1/3296* (2013.01); *G06F 1/324* (2013.01); *G06F 1/3228* (2013.01); *G06F 1/3206* (2013.01); *G06F 9/3885* (2013.01); *H04L 67/10* (2013.01); *Y02B 60/1217* (2013.01); *Y02B 60/1285* (2013.01)

(58) Field of Classification Search
None
See application file for complete search history.

(56) References Cited

U.S. PATENT DOCUMENTS

| 6,901,522 | B2 | 5/2005 | Buch | |
|---|---|---|---|---|
| 7,698,575 | B2 * | 4/2010 | Samson | ........................ 713/300 |
| 8,010,822 | B2 | 8/2011 | Marshall et al. | |
| 8,024,590 | B2 | 9/2011 | Song et al. | |

(Continued)

FOREIGN PATENT DOCUMENTS

EP    1557743 A2    7/2005

OTHER PUBLICATIONS

International Search Report and Written Opinion—PCT/US2012/039456—ISA/EPO—Mar. 4, 2013.

(Continued)

*Primary Examiner* — Ji H Bae
(74) *Attorney, Agent, or Firm* — Nicholas A. Cole

(57) ABSTRACT

Methods and apparatus for accomplishing dynamic frequency/voltage control between at least two processor cores in a multi-processor device or system include receiving busy, idle and wait, time and/or frequency information from a first processor core and receiving busy, idle, wait, time and/or frequency information from a second processor core. The received busy, idle, wait, time and/or frequency information may be correlated to identify patterns of interdependence. The correlated information may be used to determine dynamic frequency/voltage control settings for the first and second processor cores to provide a performance level that accommodates interdependent processes, threads and processor cores. The correlation of received busy, idle, wait, time and/or frequency information may involve generating a consolidated busy/idle pulse train that can then be used to set the frequency or voltage of each processor core independently.

40 Claims, 11 Drawing Sheets

(56) References Cited

U.S. PATENT DOCUMENTS

| | | |
|---|---|---|
| 8,069,446 B2 | 11/2011 | Zhao et al. |
| 8,631,411 B1 | 1/2014 | Ghose |
| 2005/0022038 A1* | 1/2005 | Kaushik et al. ............... 713/300 |
| 2006/0026447 A1* | 2/2006 | Naveh et al. .................. 713/322 |
| 2007/0300227 A1 | 12/2007 | Mall et al. |
| 2008/0005592 A1 | 1/2008 | Allarey et al. |
| 2008/0109814 A1 | 5/2008 | Park |
| 2009/0249094 A1* | 10/2009 | Marshall et al. ............... 713/320 |
| 2009/0309885 A1 | 12/2009 | Samson et al. |
| 2009/0328055 A1 | 12/2009 | Bose et al. |
| 2010/0153761 A1 | 6/2010 | Nishioka |
| 2010/0241884 A1 | 9/2010 | Barsness et al. |
| 2010/0299541 A1 | 11/2010 | Ishikawa et al. |
| 2011/0022871 A1 | 1/2011 | Bouvier et al. |
| 2011/0078469 A1 | 3/2011 | Therien |
| 2011/0087909 A1* | 4/2011 | Kanakogi ..................... 713/322 |
| 2011/0088041 A1 | 4/2011 | Alameldeen et al. |
| 2011/0113270 A1 | 5/2011 | Carter et al. |
| 2011/0145605 A1 | 6/2011 | Sur et al. |
| 2011/0145615 A1 | 6/2011 | Rychlik et al. |
| 2011/0145624 A1 | 6/2011 | Rychlik et al. |
| 2011/0145824 A1 | 6/2011 | Thomson et al. |
| 2011/0173617 A1 | 7/2011 | Gargash et al. |
| 2011/0191607 A1* | 8/2011 | Gunther et al. ............... 713/300 |
| 2011/0191783 A1 | 8/2011 | Le Moal |
| 2011/0225590 A1 | 9/2011 | Thomson et al. |
| 2011/0296212 A1 | 12/2011 | Elnozahy et al. |
| 2012/0131309 A1 | 5/2012 | Johnson et al. |
| 2013/0060555 A1* | 3/2013 | Thomson et al. ............... 703/21 |
| 2013/0238912 A1* | 9/2013 | Priel et al. ..................... 713/300 |

OTHER PUBLICATIONS

Langen, P., et al., "Leakage-Aware Multiprocessor Scheduling", Journal of Signal Processing Systems; for Signal, Image, and Video Technology (Formerly The Journal of VLSI Signal Processing Systems for Signal, Image, and Video Technology), Springer US, Boston, vol. 57, No. 1, May 20, 2008, pp. 73-88, XP019734466, ISSN:1939-8115 abstract paragraph [0004].

Liu, H., et al., "Combining Coarse-Grained Software Pipelining with DVS for Scheduling Real-Time Periodic Dependent Tasks on Multi-Core Embedded Systems", Journal of Signal Processing Systems; for Signal, Image, and Video Technology (Formerly The Journal of VLSI Signal Processing Systems for Signal, Image, and Video Technology), Springer US, Boston, vol. 57, No. 2, Nov. 26, 2008, pp. 249-262, XP019734482, ISSN:1939-8115 abstract paragraph [0001]—paragraph [0004].

* cited by examiner

SYSTEM AND APPARATUS FOR CONSOLIDATED DYNAMIC FREQUENCY/VOLTAGE CONTROL

RELATED APPLICATIONS

This application claims the benefit of priority to U.S. Provisional Application No. 61/495,861, entitled "System and Apparatus for Consolidated Dynamic Frequency/Voltage Control" filed Jun. 10, 2011, the entire contents of which are hereby incorporated by reference.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. For example, mobile electronic devices now commonly include system-on-chips (SoCs) and/or multiple microprocessor cores embedded on a single substrate, allowing mobile device users to execute complex and power intensive software applications on their mobile devices. As a result, a mobile device's battery life and power consumption characteristics are becoming ever more important considerations for consumers of mobile devices.

Methods for improving the battery life of multiprocessor devices generally involve reducing the amount of energy consumed by reducing the voltage applied to the processors/cores when they are idle or lightly loaded. Reducing the voltage applied to processors/core necessarily involves reducing the frequency at which the processors operate. Such reductions in frequency and voltage may be accomplished by scaling the voltage/frequency using dynamic clock and voltage/frequency scaling (DCVS) schemes/processes.

Generally, DCVS schemes/processes monitor the proportion of the time that the processor core is idle compared to the time it is busy to determine how the frequency and voltage should be adjusted to provide power-efficient operation. For example, the busy and idle periods may be reviewed, and a decision may be made regarding the most energy efficient performance of the processor, in real time or "on the fly." However, existing DCVS solutions for multicore processors require that each processing core include a DCVS module/process and/or adjust the processor's frequency/voltage independent of other cores. Conventional DCVS solutions exhibit a number of performance problems, and implementing an effective DCVS method that correctly scales frequency/voltage for each core of multicore processor system is an important and challenging design criterion.

SUMMARY

The various aspects include methods for correlating dynamic frequency and/or voltage control between at least two processor cores that determines a frequency performance level for the two or more processor cores which accommodates processes involving interactions between the processor cores. The various aspects evaluate the performance of each processor core to determine if there exists a correlation between the operations of two or more cores, and scale the frequency/voltage of an individual core only when there is no identifiable correlation between the processor operations. Various aspects correlate the workloads (e.g., busy versus idle states) of two or more processor cores, and may scale the frequency/voltage of the cores to a level consistent with the correlated processes such that the processing performance is maintained and maximum energy efficiency is achieved. In various aspects, the method may further include receiving an input/output activity signal from one of the first and the second processor cores, and using the received input/output activity signal in determining the consolidated dynamic frequency/voltage control for the first and the second processor cores.

The various aspects include methods of performing dynamic clock and/or voltage scaling on a multiprocessor system having two or more processor cores, which may include receiving a first set of information from a first processor core, the first information set including information regarding at least one of a frequency, time, busy periods, idle periods, and wait periods of the first processor core, receiving a second set of information from a second processor core, the second information set including information regarding at least one of a frequency, time, busy periods, idle periods, and wait periods of the second processor core, correlating the first and second information sets to identify an interdependence relationship between the operations of the first processor cores and the operations of the second processor cores, and scaling the frequency and/or the voltage of the first and second cores according to a correlated information set when an interdependence relationship is identified between the operations of the first processor core and the operations of the second processor core is identified. In an aspect, the method may further include scaling the frequency or voltage of the first and second cores independently when no interdependence relationship is identified between the operations of the first processor core and the operations of the second processor core, or any number of the processor cores. In an aspect, the method may further include synchronizing the first and second information sets, as well as any number of received information sets. In a further aspect, operations of correlating information sets to identify a relationship between the operations of the first processor core and the operations of the second processor core may include identifying a relationship in which the first processor core is busy when the second processor core is idle. In this aspect, the method may further include subtracting a busy time value associated with the first core from an idle time value associated with the second core. In a further aspect, correlating the synchronized first and second information sets to identify a relationship between the operations of the first processor core and the operations of the second processor core may include identifying a relationship in which the first processor core is busy when the second processor core is idle. In this aspect, the method may further include subtracting a busy time value associated with the second core from an idle time value associated with the first core. In a further aspect, correlating the synchronized first and second information sets to identify a relationship between the operations of the first processor core and the operations of the second processor core may include overlaying a first busy pulse train on a second busy pulse train. In a further aspect, the first and second information sets may include pulse trains selected from one of a busy pulse train, an idle pulse train, and a wait pulse train, and synchronizing the first and second information sets may include synchronizing a first pulse train with a second pulse train. In a further aspect, a single thread executing on the multiprocessor system may perform the dynamic clock and voltage scaling operations. In a further aspect, correlating the synchronized first and second information sets to identify a relationship between the operations of the first processor core and the operations of the second processor core may include producing a consolidated pulse train for each of the first and the second processing cores. In a further aspect, correlating the synchronized first and second information sets to identify a relationship between the operations of the first processor core and the operations of the second processor core may further include using the consolidated pulse train for each of the first and the second processing cores to determine a performance level of each of the first and second processing cores independently. In further aspects, the operations described above may be accomplished for any number of processor cores which may be in a computing device, including receiving any number information sets and correlating some or all of the information sets may be correlated to identify relationships among the cores.

Further aspects include a computing device having memory and two or more processor cores coupled to the memory, wherein at least one of the processor cores is configured with processor-executable instructions to cause the computing device to perform operations of the aspect methods for performing dynamic clock and/or voltage scaling on a multiprocessor system. In an aspect, the at least one of the processor cores may be configured with processor-executable instructions to cause the computing device to perform operations that may include receiving a first set of information from a first processor core, the first information set including information regarding at least one of a frequency, time, busy periods, idle periods, and wait periods of the first processor core, receiving a second set of information from a second processor core, the second information set including information regarding at least one of a frequency, time, busy periods, idle periods, and wait periods of the second processor core, correlating the first and second information sets to identify an interdependence relationship between the operations of the first processor cores and the operations of the second processor cores, and scaling the frequency or voltage of the first and second cores according to a correlated information set when an interdependence relationship is identified between the operations of the first processor core and the operations of the second processor core is identified. In an aspect, at least one of the processor cores may be configured with processor-executable instructions to cause the computing device to perform operations that include scaling the frequency or voltage of the first and second cores independently when no interdependence relationship is identified between the operations of the first processor core and the operations of the second processor core. In an aspect, at least one of the processor cores may be configured with processor-executable instructions to cause the computing device to perform operations that include synchronizing the first and second information sets.

In a further aspect, at least one of the processor cores may be configured with processor-executable instructions to cause the computing device to perform operations such that correlating the synchronized first and second information sets to identify a relationship between the operations of the first processor core and the operations of the second processor core includes identifying a relationship in which the first processor core is busy when the second processor core is idle. In this aspect, the at least one of the processor cores may be configured with processor-executable instructions to cause the computing device to perform operations that include subtracting a busy time value associated with the first core from an idle time value associated with the second core.

In a further aspect, at least one of the processor cores may be configured with processor-executable instructions to cause the computing device to perform operations such that correlating the synchronized first and second information sets to identify a relationship between the operations of the first processor core and the operations of the second processor core includes identifying a relationship in which the first processor core is busy when the second processor core is idle. In this aspect, at least one of the processor cores may be configured with processor-executable instructions to cause the computing device to perform operations that include subtracting a busy time value associated with the second core from an idle time value associated with the first core.

In a further aspect, at least one of the processor cores may be configured with processor-executable instructions to cause the computing device to perform operations such that correlating the synchronized first and second information sets to identify a relationship between the operations of the first processor core and the operations of the second processor core includes overlaying a first busy pulse train on a second busy pulse train. In a further aspect, at least one of the processor cores may be configured with processor-executable instructions to cause the computing device to perform operations such that the first and second information sets include pulse trains selected from one of a busy pulse train, an idle pulse train, and a wait pulse train, and synchronizing the first and second information sets includes synchronizing a first pulse train with a second pulse train. In a further aspect, at least one of the processor cores may be configured with processor-executable instructions to cause the computing device to perform operations that include a single thread executing on the multiprocessor system performs the dynamic clock and voltage scaling operations.

In a further aspect, at least one of the processor cores may be configured with processor-executable instructions to cause the computing device to perform operations such that correlating the synchronized first and second information sets to identify a relationship between the operations of the first processor core and the operations of the second processor core includes producing a consolidated pulse train for each of the first and the second processing cores. In a further aspect, at least one of the processor cores may be configured with processor-executable instructions to cause the computing device to perform operations such that correlating the synchronized first and second information sets to identify a relationship between the operations of the first processor core and the operations of the second processor core further includes using the consolidated pulse train for each of the first and the second processing cores to determine a performance level of each of the first and second processing cores independently.

Further aspects include a non-transitory processor-readable storage medium having stored thereon processor-executable instructions configured to cause at least one processor core of a multi-processor system to perform operations of the aspect methods for performing dynamic clock and/or voltage scaling. Further aspects include a computing device having various means for performing functions of the aspect methods for performing dynamic clock and/or voltage scaling on a multiprocessor system.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
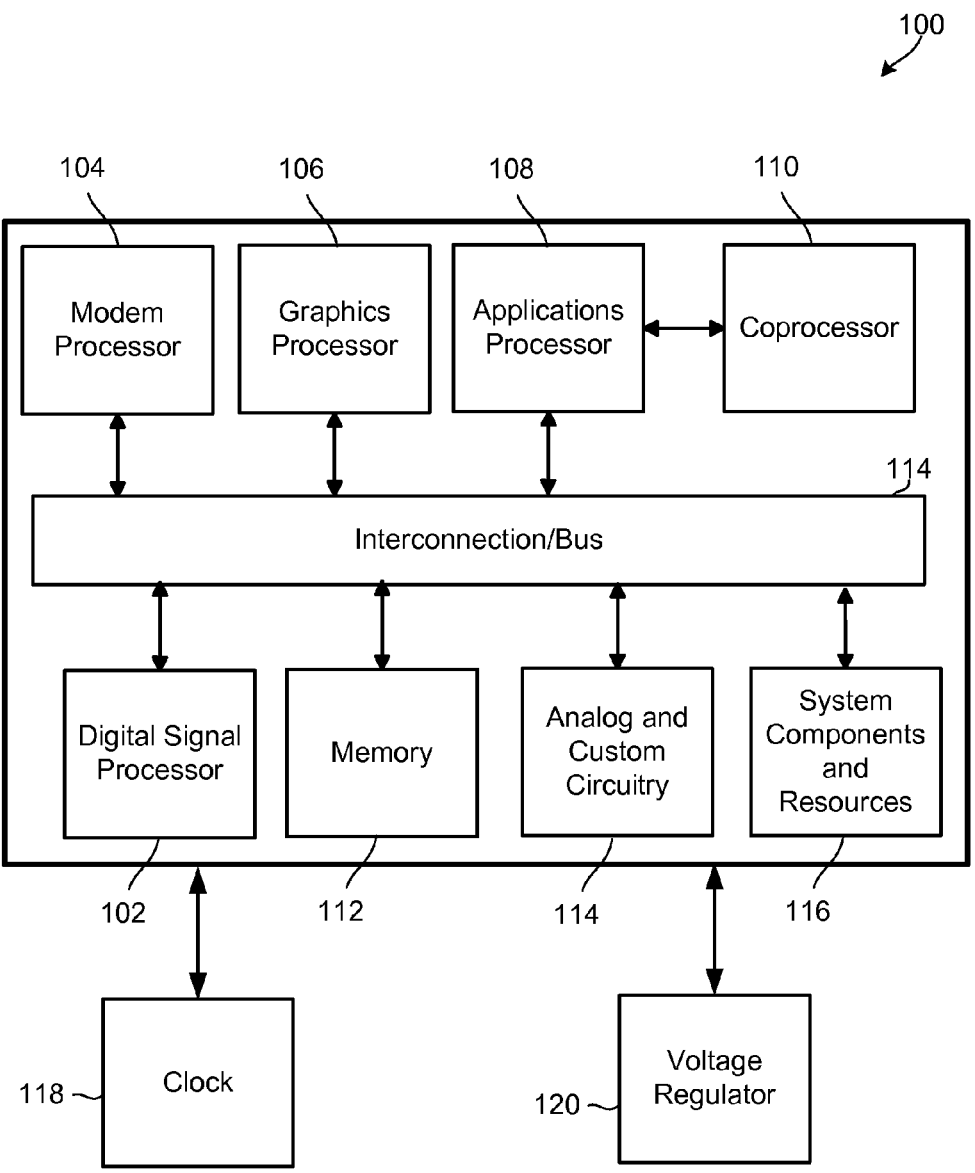
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of personal mobile television receivers, cellular telephones, personal data assistants (PDA's), multimedia Internet enabled cellular telephones (e.g., the Blackberry®, Google® Android® compatible phones, Apple® I-Phones®, etc.), tablet computers, palm-top computers, laptop computers, netbooks, and similar personal electronic devices which include a programmable processor and operate under battery power such that power conservation methods are of benefit.

Computer program code or "program code" for execution on a programmable processor for carrying out operations of the various aspects may be written in a high level programming language such as C, C++, C#, JAVA, Smalltalk, JavaScript, J++, Visual Basic, TSQL, Perl, or in various other programming languages. Programs for some target processor architecture may also be written directly in the native assembler language. A native assembler program uses instruction mnemonic representations of machine level binary instructions. Program code or programs stored on a computer readable storage medium as used herein refers to machine language code such as object code whose format is understandable by a processor.

Many kernels are organized into user space (where non-privileged code runs) and kernel space (where privileged code runs). This separation is of particular importance in Android and other general public license (GPL) environments where code that is part of the kernel space must be GPL licensed, while code running in user-space doesn't need to be GPL licensed.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (DSP, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used herein to refer to a single integrated circuit (IC) chip or chip package that contains two or more independent processing cores (e.g., CPU cores) configured to read and execute program instructions. A SOC may include multiple multicore processors, and each processor in an SOC may be referred to as a core.

The term "resource" is used herein to refer to any of a wide variety of circuits (e.g., ports, clocks, buses, oscillators, etc.), components (e.g., memory), signals (e.g., clock signals), and voltages (e.g., voltage rails) which are used to support processors and clients running on a computing device.

Generally, the dynamic power (switching power) dissipated by a chip is $C*V^2*f$, where C is the capacitance being switched per clock cycle, V is voltage, and f is the switching frequency. Thus, as frequency changes, the dynamic power will change linearly with it. Dynamic power may account for approximately two-thirds of the total chip power. Dynamic voltage scaling may be accomplished in conjunction with frequency scaling, as the frequency that a chip runs at may be related to the operating voltage. The efficiency of some electrical components, such as voltage regulators, may decrease with increasing temperature such that the power used increases with temperature. Since increasing power use may increase the temperature, increases in voltage or frequency may increase system power demands even further.

Dynamic scaling of voltage and frequency has previously been accomplished by voltage scaling/frequency scaling dynamic clock and voltage scaling (DCVS) mechanisms implemented within each processing core. Generally, each processing core DCVS functions to adjust its frequency/voltage independent of other processor cores within the multiprocessor and/or computing device. However, this can present performance issues when two or more processor cores are processing threads alternatively. This may occur when a single thread is processed by a first processor core then by a second processor and then again by the first processor core. This may also occur when multiple threads are processing on respective processor cores and the results of one thread in one processor core trigger operations of another thread in a second processor core. In these situations, each processor core may alternatively enter idle states while it awaits the results of processing in the other processor core. If each processor core DCVS considers only the busy and idle conditions of its own core, this interdependency of two or more processor cores will not be considered by conventional DCVS methods. As a result, one or more of the processor cores may shift to a lower frequency/voltage state to conserve power because the processor core is idle a significant portion of the time. The slower a processor operates (i.e., the lower its operating frequency), the more energy efficient it becomes, but the longer it takes to process a thread. Consequently, the time to process a thread or threads on each processor core operating at the lower frequency/voltage condition will increase, forcing the other processing core to wait longer for the results. Thus, even though the microprocessor or computing device as a whole is busy running one or more threads, the independently-acting processor cores may incorrectly conclude that the microprocessor can be operated at lower frequency/voltage states in order to conserve power. That is, existing DCVS solutions may cause the multicore processor system to mischaracterize the processor workloads and incorrectly adjust the frequency/voltage of the cores based on the mischaracterized workloads. The result can be a multicore processor that exhibits poor performance in some operating situations.

For example, two or more processor cores may be operating on a single thread. Conventional DCVS methods would examine processing demands on a single processor core to determine the suitable frequency/voltage for that core. Conventional DCVS methods would reduce the frequency/voltage via an algorithm that is only applied on a single processing core. If a second core is present, the operating system may provide part of the thread to the second core, but the DCVS algorithm on the second processor core would only evaluate the busy/idle duty cycle of the second processing core. Since the second processor core periodically waits for results from the first processor core, the DCVS algorithm may also reduce the frequency/voltage of the second processing core. This may result in a processing time being increased substantially. However, given that it is a single thread, the processing time to process the entire thread will increase since both processor cores are operating at lower speed.

To overcome the problems with conventional DCVS mechanisms for conserving power, the various aspects include methods which correlate the workload (e.g., busy versus idle states) of two or more processor cores, and scale the frequency and voltage of the two or more processor cores to a level consistent with correlated processes to maintain processing performance while achieving energy efficiency. The present disclosure includes a single threaded DCVS application that simultaneously monitors the cores, creates pulse trains, and correlates the pulse trains in order to determine the voltage/frequency for each core. Each of the cores may provide an input stream to the DCVS algorithm, which the DCVS algorithm may use to produce a correlated pulse train for each core. The correlated pulse train for each core is used to determine the appropriate voltage/frequency for the core. The determined voltage/frequency changes may be applied to each core at or near the same point in time. Each core provides an input stream to a process occurring on one of the cores that correlates the busy/idle patterns among the cores to recognize when two or more cores are performing interdependent processes. In an aspect, this single thread DCVS algorithm may be accomplished on any of the multiple processor cores, such as the first processor core trigger to evaluate whether an adjustment to frequency/voltage is appropriate.

There are several levels at which the busy/idle signal and/or its representations may be viewed. At the lowest level, the busy/idle signal may represent a state of a core being busy or idle, which may be sampled on every clock cycle, for example. However, at the operating system (OS) level the overhead for sampling at this rate and representing it may be prohibitive. Thus, in an aspect, the busy/idle signals may be represented as values followed by the number of clock cycles [e.g., 0(4ticks)-1(6ticks)-0(2ticks)-1(4ticks) . . . ]. In an aspect, instead of sampling on every clock cycle, the system may sample only on transitions between certain states/values (e.g., sample transitions between 0 and 1), thereby improving the efficiency of generating pulse chains.

It should be understood that while various aspects are described in terms of a specific embodiment of pulse chains, the analysis (e.g., correlation) may be performed on the fly at transition points (e.g., between busy and idle) such that a pulse train is not generated.

In an aspect, the system may be configured to perform the correlation operations using virtual pulse chains. In this implementation, the system may drive idle-stats pulse chain generated from changes in the run-queue depth, instead of the CPU idle thread. In an aspect, the system may be configured such that the CPU busy mapped to the run queue depth may be greater than the number of CPUs. In an aspect, the DCVS algorithm may be extended to allow for dropping CPU frequency to zero for certain CPUs (e.g., CPU 1 through CPU3). Various aspects may eliminate the need for an RQ statistics driver and/or the need to poll for the run queue depth. Various aspects may apply performance guarantees to a multiprocessor decision, and the decision may be a seamless extension to the DCVS algorithm.

In an aspect, the system may be configured to sample on every clock cycle and correlate the busy/idle for all the cores during that cycle, accumulating the results in order to make a decision for each core. Once the window of time that is correlated is complete, the system may return the accumulated result for each core and reset the accumulators. Hence, in an aspect, the physical pulse chain for each core may be as small as a single bit (0/1), whereas in another aspect, the physical pulse chain may be as large as the window period.

In an aspect, the correlation may be performed on every zero to one (0/1) transition. In an aspect, the system may be configured to maintain only the accumulated result and the last transition for each core.

The various aspects may be implemented on a number of multicore and multiprocessor systems, including a system-on-chip (SOC). FIG. 1 is an architectural diagram illustrating an example system-on-chip (SOC) 100 architecture that may be used to implement the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the processors. Each processor may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 7).

The SOC 100 may also include analog circuitry and custom circuitry 114 for managing sensor data, analog-to-digital conversions, wireless data transmissions, and performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components, and resources 116 and custom circuitry 114 via an interconnection/bus module, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

Figure 2:
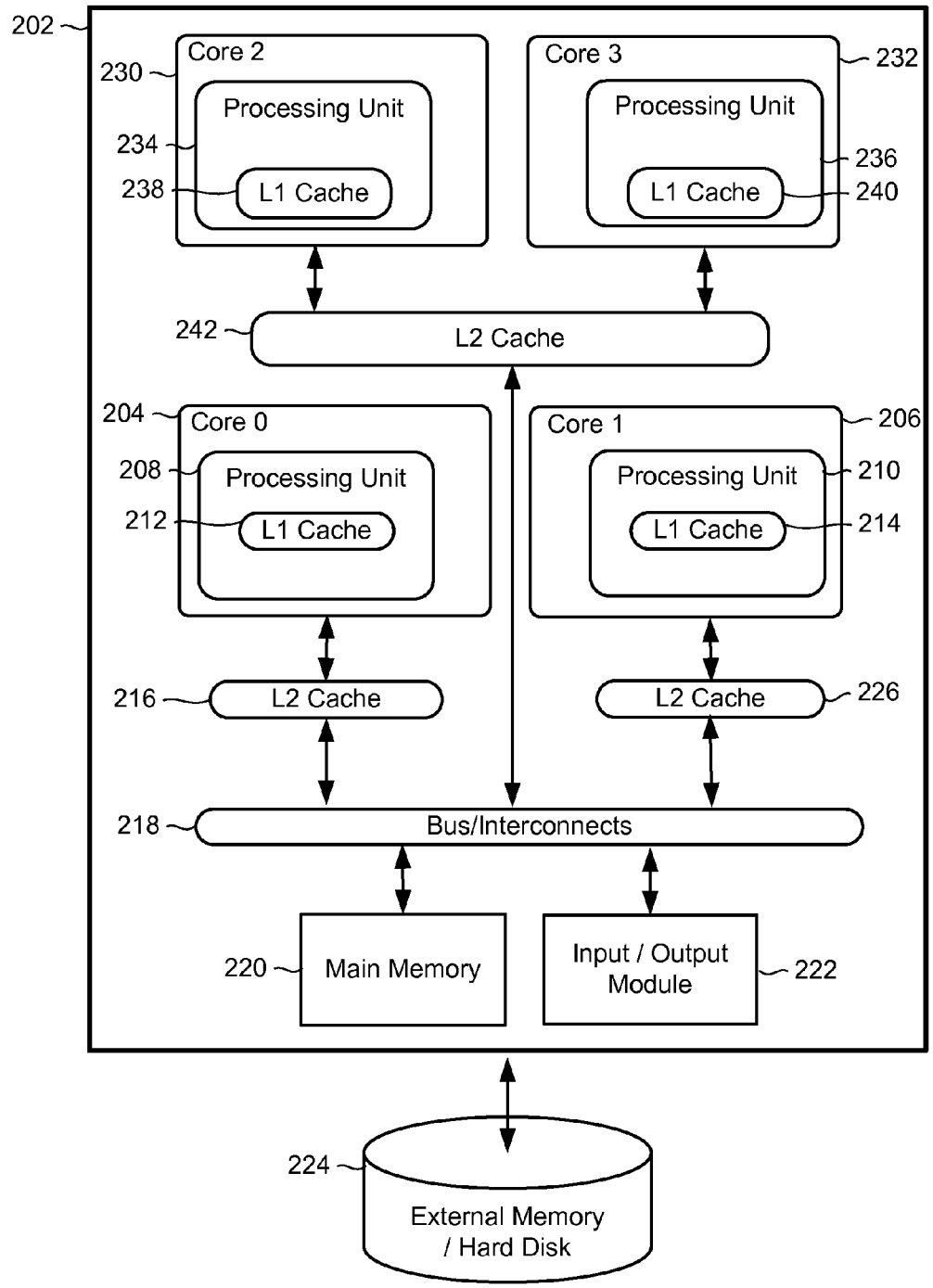
FIG. 2 is an architectural diagram of an example multicore processor suitable for implementing the various aspects.

FIG. 2 is an architectural diagram illustrating an example multicore processor architecture that may be used to implement the various aspects. The multicore processor 202 may include two or more independent processing cores 204, 206, 230, 232 in close proximity (e.g., on a single substrate, die, integrated chip, etc.). The proximity of the processors/cores allows memory to operate at a much higher frequency/clock-rate than is possible if the signals have to travel off-chip. Moreover, the proximity of the cores allows for the sharing of on-chip memory and resources (e.g., voltage rail), as well as for more coordinated cooperation between cores.

The multicore processor 202 may include a multi-level cache that includes Level 1 (L1) caches 212, 214, 238, 240 and Level 2 (L2) caches 216, 226, 242. The multicore processor 202 may also include a bus/interconnect interface 218, a main memory 220, and an input/output module 222. The L2 caches 216, 226, 242 may be larger (and slower) than the L1 caches 212, 214,238, 240, but smaller (and substantially faster) than a main memory unit 220. Each processing core 204, 206, 230, 232 may include a processing unit 208, 210, 234, 236 that has private access to an L1 cache 212, 214, 238, 240. The processing cores 204, 206, 230, 232 may share access to an L2 cache (e.g., L2 cache 242) or may have access to an independent L2 cache (e.g., L2 cache 216, 226).

The L1 and L2 caches may be used to store data frequently accessed by the processing units, whereas the main memory 220 may be used to store larger files and data units being accessed by the processing cores 204, 206, 230, 232. The multicore processor 202 may be configured such that the processing cores 204, 206, 230, 232 seek data from memory in order, first querying the L1 cache, then L2 cache, and then the main memory if the information is not stored in the caches. If the information is not stored in the caches or the main memory 220, multicore processor 202 may seek information from an external memory and/or a hard disk memory 224.

The processing cores 204, 206, 230, 232 may communicate with each other via a bus/interconnect 218. Each processing core 204, 206, 230, 232 may have exclusive control over some resources and share other resources with the other cores.

The processing cores 204, 206, 230, 232 may be identical to one another, be heterogeneous, and/or implement different specialized functions. Thus, processing cores 204, 206, 230, 232 need not be symmetric, either from the operating system perspective (e.g., may execute different operating systems) or from the hardware perspective (e.g., may implement different instruction sets/architectures).

Multiprocessor hardware designs, such as those discussed above with reference to FIGS. 1 and 2, may include multiple processor cores of different capabilities inside the same package, often on the same piece of silicon. Symmetric multiprocessing hardware includes two or more identical processors connected to a single shared main memory that are controlled by a single operating system. Asymmetric or "loosely-coupled" multiprocessing hardware may include two or more heterogeneous processors/cores that may each be controlled by an independent operating system and connected to one or more shared memories/resources.

Figure 3:
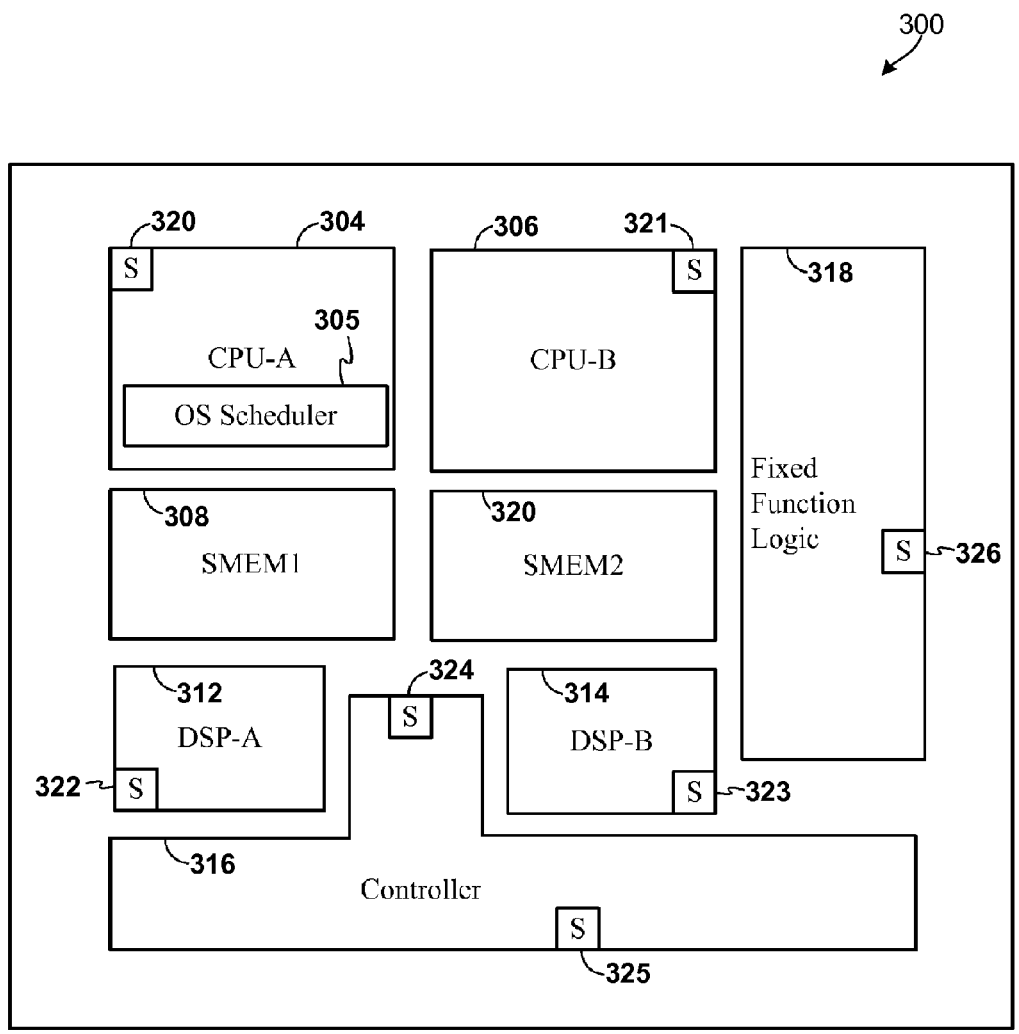
FIG. 3 is a block diagram of a controller having multiple cores suitable for use in an aspect.

FIG. 3 illustrates an exemplary asymmetric multi-core processor system on a chip (SoC) 300 that illustrates a multi-core processor configuration suitable for implementation with the various aspects. The illustrated example multi-core processor 300 includes a first central processing unit A (CPU-A) 304, a second central processing unit (CPU-B) 306, a first shared memory (SMEM-1) 308, a second shared memory (SMEM-2) 310, a first digital signal processor (DSP-A) 312, a second digital signal processor (DSP-B) 314, a controller 316, fixed function logic 318 and sensors 320-326. The sensors 320-326 may be configured to monitor conditions that may affect task assignments on the various processor cores, such as CPU-A 304, CPU-B 306, DSP-A 312, and DSP-B 314, and which may affect operation on the controller 316 and fixed function logic 318. An operating system (OS) scheduler 305 may operate on one or more of the processors in the multi-core processor system. The scheduler 305 may schedule tasks to run on the processors based on the relative power and performance curves of the multiprocessor system across the process, voltage, temperature (PVT) operating space, as described in more detail below.

Each of the cores may be designed for different manufacturing processes. For example, core-A may be manufactured primarily with a low voltage threshold (lo-Vt) transistor process to achieve high performance, but at a cost of increased leakage current, where as core-B may be manufactured primarily with a high threshold (hi-Vt) transistor process to achieve good performance with low leakage current. As another example, each of the cores may be manufactured with a mix of hi-Vt and lo-Vt transistors (e.g., using the lo-Vt transistors in timing critical path circuits, etc.).

In addition to the processors on the same chip, the various aspects may also be applied to processors on other chips (not shown), such as CPU, a wireless modem processor, a global positioning system (GPS) receiver chip, and a graphics processor unit (GPU), which may be coupled to the multi-core processor 300. Various configurations are possible and within the scope of the present disclosure. In an aspect, the chip 300 may form part of a mobile computing device, such as a cellular telephone.

As mentioned above, the various aspects provide improved methods, systems, and devices for conserving power and improving performance in multicore processors and systems-on-chip. The inclusion of multiple independent cores on a single chip, and the sharing of memory, resources, and power architecture between cores, gives rise to a number of power management issues not present in more distributed multiprocessing systems. Thus, a different set of design constraints may apply when designing power management and voltage/frequency scaling strategies for multicore processors and systems-on-chip than for other more distributed multiprocessing systems.

As discussed above, in conventional multiprocessor systems, each processor/core generally implements a dynamic clock frequency/voltage scaling (DCVS) scheme that scales the frequency/voltage of the processor/core independently, i.e., without regards to the other processors/cores. This conventional configuration can lead to problems because a single thread may execute operations on more than one processor core, causing the DCVS module to incorrectly conclude that the cores are idle or operating below their actual capacity. As a result, the DCVS module may incorrectly scale the frequency/voltage of the processor core. For example, if a single thread is shared amongst two processor cores (e.g., a CPU and a GPU), each core may appear to the system as operating at 50% of its capacity. Existing DCVS implementations view such cores as being underutilized and/or as having too much voltage allocated to them, and in response, may reduce the frequency/voltage of the cores in an attempt to conserve energy. However, in actuality, these cores may be performing operations in cooperation with one another (i.e., cores are not actually underutilized), and the perceived idle times may be wait, hold and/or resource access times. Consequently, in such situations conventional DCVS implementations improperly reduce the frequency/voltage of the cooperating processors. Additionally, since reducing the frequency/voltage of these processors does not result in the cores appearing any more busy/utilized (i.e., the cores are still bound by the wait/hold times and will continue to appear as operating at 50% capacity), existing DCVS implementations may further reduce the frequency/voltage of the processors until the system slows to a halt or reaches a minimum operating state. Therefore, conventional DCVS methods may result in a number of unintended/undesirable consequences, such as slowing down the processing and/or improperly reducing the voltage of the processors/cores.

The various aspects overcome these and other problems with conventional DCVS schemes by consolidating the DCVS schemes of the various processors/core in a multiprocessor system. The various aspects evaluate the performance of each processor core to determine if there exists a correlation between the operations of two or more cores, and scale the frequency/voltage of an individual core only when there is no identifiable correlation between the processor operations. Various aspects correlate the workloads (e.g., busy versus idle states) of two or more processor cores, and scale the frequency/voltage of the cores to a level consistent with the correlated processes such that the processing performance is maintained and maximum energy efficiency is achieved. Various aspects determine which processors should be controlled by the consolidated DCVS scheme, and which processors should have their frequencies/voltages scaled independently. For example, the various aspects may consolidate the DCVS schemes of two CPUs and a two-dimensional graphics processor, while operating an independent DCVS scheme on a three-dimensional graphics processor.

Figure 4:
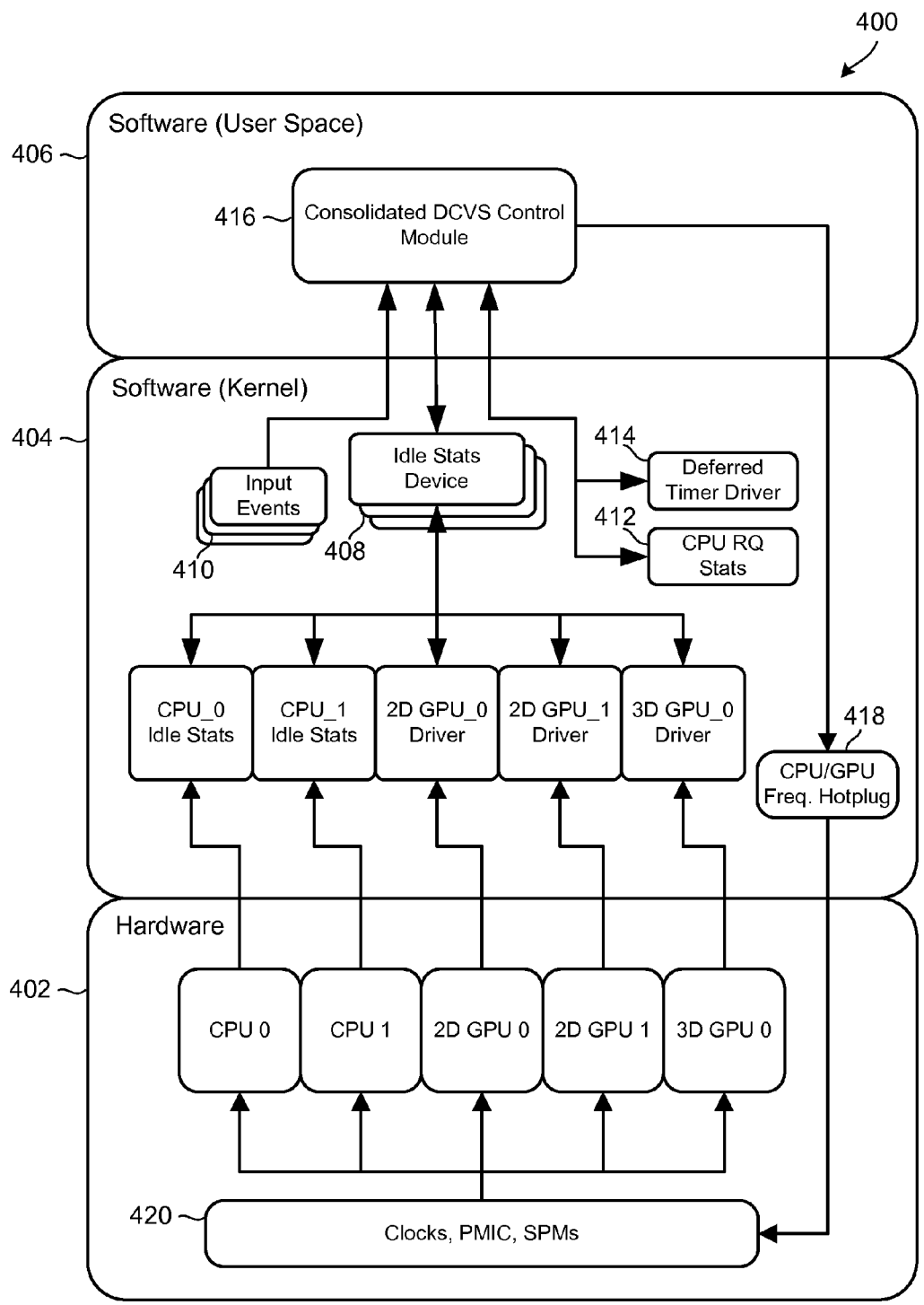
FIG. 4 is a process flow diagram of an aspect method for correlating idle and busy periods across processing cores to determine performance objectives for a system.

FIG. 4 illustrates logical components and information flows in a computing device 400 implementing a consolidated dynamic clock frequency/voltage scaling (DCVS) scheme in accordance with the various aspects. The computing device 400 may include a hardware unit 402, a kernel software unit 404, and a user space software unit 406. The hardware unit 402 may include a number of processors/cores (e.g., CPU 0, CPU 1, 2D-GPU 0, 2D-GPU 1, 3D-GPU 0, etc.), and a resources module 420 that includes hardware resources (e.g., clocks, power management integrated circuits (PMIC), scratchpad memories (SPMs), etc.) shared by the processors/cores.

The kernel software unit 404 may include processor modules (CPU_0 Idle stats, CPU_1 idle stats, 2D-GPU_0 driver, 2D-GPU_1 driver, 3D-GPU_0 driver, etc.) that correspond to at least one of the processors/cores in the hardware unit 402, each of which may communicate with one or more idle stats device modules 408. The kernel unit 404 may also include input event modules 410, a deferred timer driver module 414, and a CPU request stats module 412.

The user space software unit 406 may include a consolidated DCVS control module 416. The consolidated DCVS control module 416 may include a software process/task, which may execute on any of the processor cores (e.g., CPU 0, CPU 1, 2D-GPU 0, 2D-GPU 1, 3D-GPU 0, etc.). For example, the consolidated DCVS control module may be a process/task that monitors a port or a socket for an occurrence of an event (e.g., filling of a data buffer, expiration of a timer, state transition, etc.) that causes the module to collect information from all the cores to be consolidated, synchronize the collected information within a given time/data window, determine whether the workloads are correlated (e.g., cross correlate pulse trains), and perform a consolidated DCVS operation across the selected cores.

In an aspect, the consolidated DCVS operation may be performed such that the frequency/voltages of the cores whose workloads are not correlated are reduced. As part of these operations, the consolidated DCVS control module 416 may receive input from each of the idle stats device modules 408, input event modules 410, deferred timer driver module 414, and a CPU request stats module 412 of the kernel unit 404. The consolidated DCVS control module 416 may send output to a CPU/GPU frequency hot-plug module 418 of the kernel unit 404, which sends communication signals to the resources module 420 of the hardware unit 402.

In an aspect, consolidated DCVS control module 416 may include a single threaded dynamic clock and voltage scaling (DCVS) application that simultaneously monitors each core and correlates the operations of the cores, which may include generating one or more pulse trains and correlating the generated pulse trains. The correlated pulse trained may be used to determine an optimal voltage/frequency for each core. For example, each of the processors/cores may provide an input stream to the dynamic clock and voltage scaling (DCVS) module/process of the consolidated DCVS control module 416 via the idle stats device modules 408. The consolidated DCVS control module 416 may use the input streams to produce a correlated pulse train for each core. The correlated pulse train may be used to determine the appropriate voltage/frequency for each core individually, or for all the selected cores collectively. In an aspect, voltage/frequency changes may be applied to each core simultaneously, or at approximately the same point in time, via the CPU/GPU frequency hot-plug module 418.

In an aspect, the correlation may be performed in real-time on each busy to idle and/or idle to busy transition so that the process does not require the generation and monitoring of pulse chains. In another aspect, pulses may be generated and processed on the fly such that the system does not use explicit pulse chains.

Unlike existing DCVS solutions, the various aspects provide a single threaded DCVS process that may be performed on any one of the multiple processors/cores. Also unlike existing solutions, idle, and busy periods of selected cores may be evaluated, pulse trains may be generated from the input streams, and input streams from multiple cores may be synchronized and cross-correlated to provide a consolidated DCVS scheme. The synchronization of the pulse trains and the correlation of the workloads allows for determining whether the cores are performing operations that are co-operative and/or dependent on one another.

In an aspect, the frequency of the processor cores may be adjusted based on a calculated probability that the cores are performing operations that are cooperative and/or dependent on one another. The synchronization of the pulse trains and the correlation of the workloads across two or more selected cores are important and distinguishing elements that are generally lacking in existing multiprocessor DCVS solutions.

Figure 5:
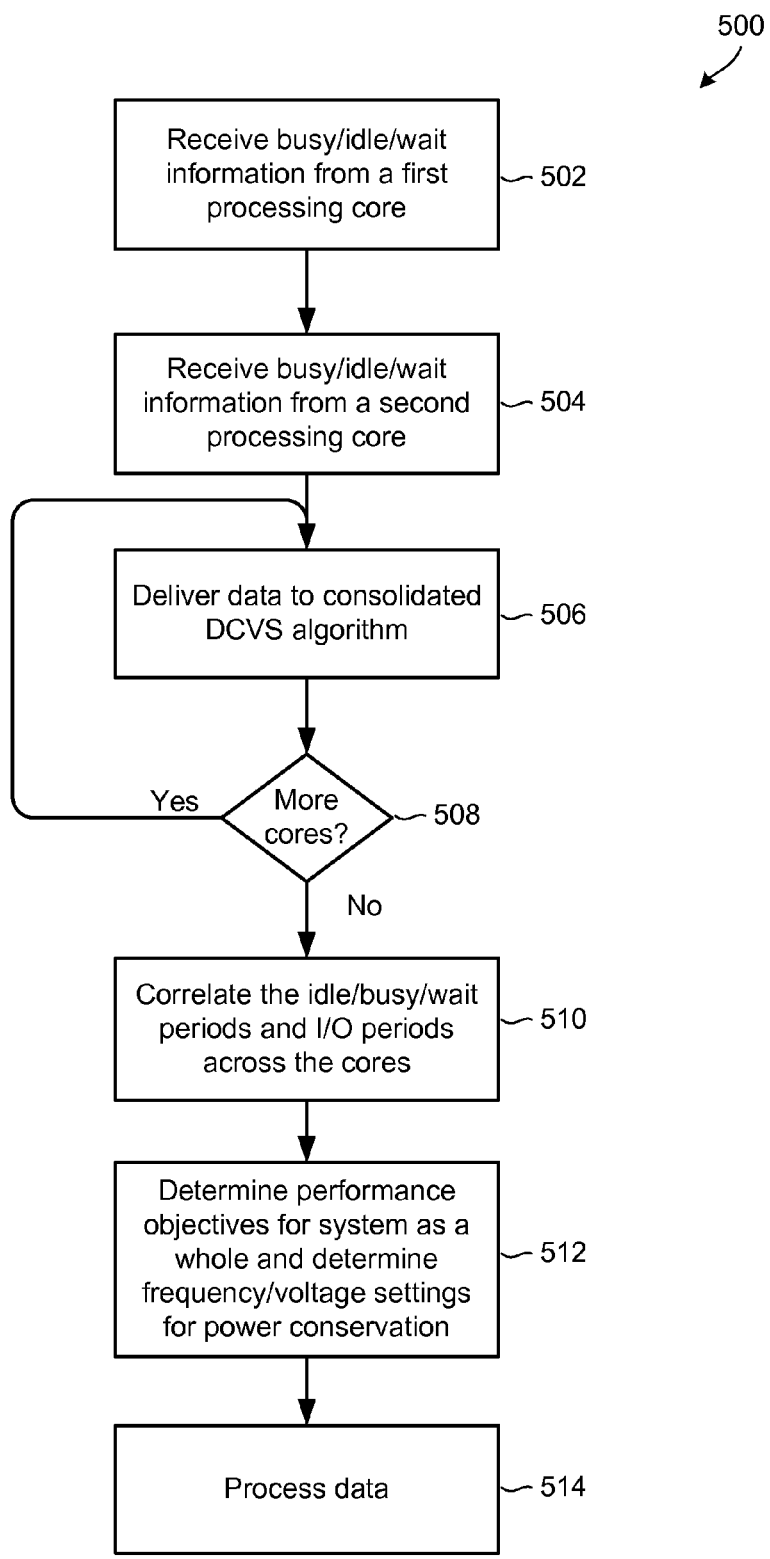
FIG. 5 is a communication flow diagram illustrating communications and processes among a driver and a number of processing cores for using pulse trains to set performance levels for each processor core according to an aspect.

FIG. 5 illustrates an aspect method 500 for dynamically correlating information sets of the idle and busy periods across some or all processing cores within a multiprocessor system in order to determine a suitable frequency/voltage condition appropriate for all processor cores in view of processes occurring across more than one processor core. The aspect method 500 may be implemented, for example, as a consolidated dynamic clock and voltage scaling (DCVS) task/process operating in the user space of a computing device having a multicore processor.

In block 502 of method 500, busy, idle, wait time, and/or frequency information sets may be received from a first processing core in a pulse train format and analyzed in a consolidated DCVS module/process (or an operating system component). In block 504, the time synchronized pulse trains (or information sets) may be received from a second processing core by the consolidated DCVS module (or an operating system component). The pulse trains received from the second processing core may be synchronized in time by tagging or linking them to a common system clock, and collecting the data within defined time windows synchronized across all monitored processor cores. In block 506, the information sets (i.e., busy/idle/wait data) from both the first and second cores may be delivered to a consolidated DCVS module for analysis. In determination block 508 the consolidated DCVS module may determine if there are more processing cores from which to gather busy/idle/wait information sets. If so (i.e., determination block 508="YES"), the processor may continue to receive busy/idle/wait information sets from the other processors/cores to the consolidated DCVS module in block 506. Once all busy/idle/wait information has been obtained from all selected processor cores, (i.e., determination block 508="NO"), the processor may correlate the idle, busy, wait, and/or input/output (I/O) periods across the processors/cores in block 510.

The analysis of the pulse trains for each of the processor cores may be time synchronized to allow for the correlation of the idle, busy, and wait states information sets among the cores during the same data windows. Within identified time/data windows, the processor may determine whether the cores are performing operations in a correlated manner (e.g., there exists a correlation between the busy and idle states of the two processors). In an aspect, the processor may also determine if threads executing on two or more of the processor cores are cooperating/dependent on one another by "looking backward" for a consistent interval (e.g., 10 milliseconds, 1 second, etc.). For example, the pulse trains relating to the previous ten milliseconds may be evaluated for each processor core to identify a pattern of cooperation/dependence between the cores.

In time synchronizing the pulse trains to correlate the states (e.g., idle, busy, wait, I/O) of the cores within a time/data window, the window may be sized (i.e., made longer or shorter) dynamically. In an aspect, the window size may not be known or determined ahead of time, and may be sized on the fly. In an aspect, the window size may be consistent across all cores (e.g., CPU 0, CPU 1, 2D-GPU 0, 2D-GPU 1, 3D-GPU 0, etc.).

Returning to FIG. 5, in block 512, the consolidated DCVS module may use the correlated information sets to determine the performance requirements for the system as a whole based on any correlated or interdependent cores or processes, and may increase or decrease the frequency/voltage applied to all processor cores in order to meet the system's performance requirements while conserving power. In block 514, the frequency/voltage settings determined by the consolidated DCVS module may be implemented in all the selected processor cores (e.g., CPU 0, CPU 1, 2D-GPU 0, 2D-GPU 1, 3D-GPU 0, etc.) simultaneously.

In an aspect, as part of blocks 510 and/or 512, the consolidated DCVS module may determine whether there are any interdependent operations currently underway among two or more of the multiple processor cores. This may be accomplished, for example, by determining whether any processor core busy pulses and idle states are occurring in an alternating pattern, indicating some interdependency of operations or threads. Such interdependency may be direct, such that operations in one core are required by the other and vice versa, or indirect, such that operations in one core lead to operations in the other core.

It should be appreciated that various core configurations are possible and within the scope of the present disclosure, and that the processor cores need not be general purpose processors. For example, the cores may include a CPU, DSP, GPU and/or other hardware cores that do not execute instructions, but which are clocked and whose performance is tied to a frequency at which the cores run. Thus, in an aspect, the voltage of a CPU may be scaled in coordination with the voltage of a GPU. Likewise, the system may determine that the voltage of a CPU should not be scaled in response to determining that the CPU and a GPU have correlated workloads.

Figure 6:
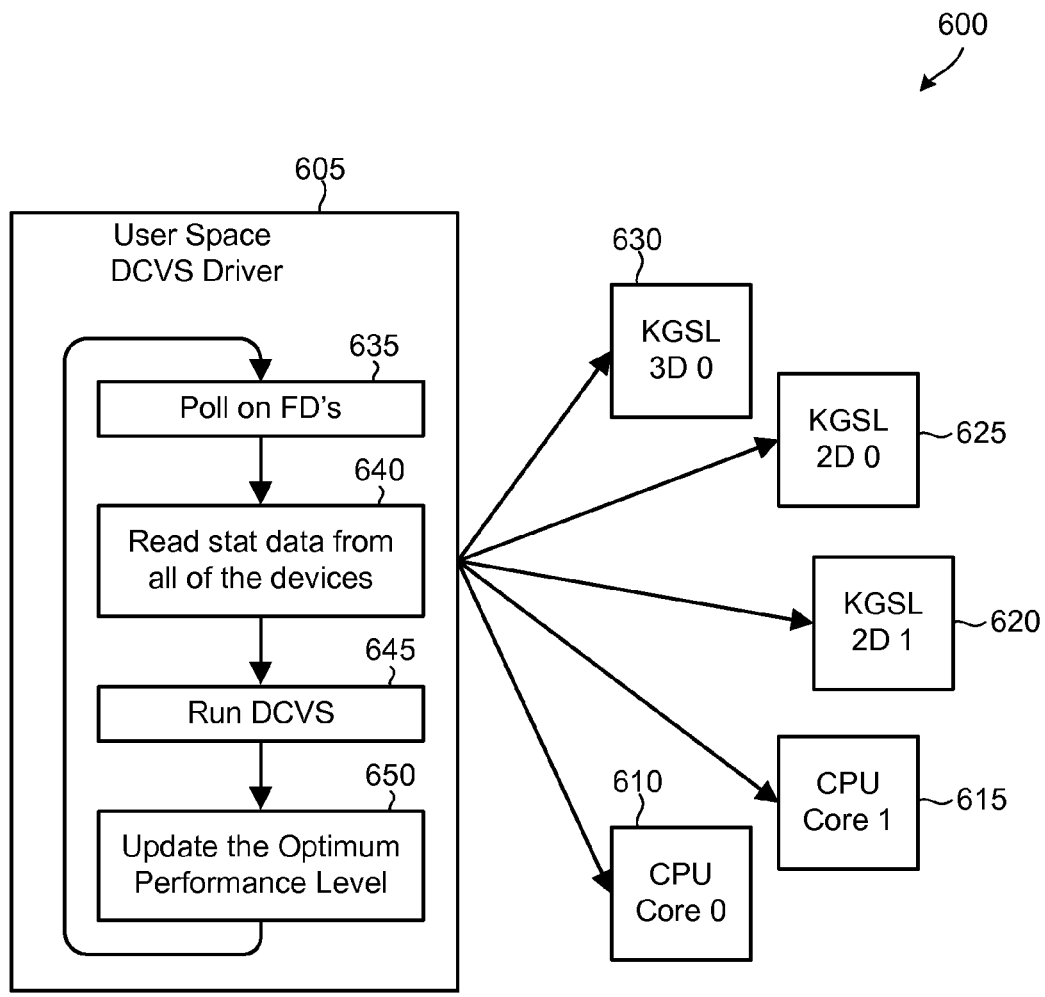
FIG. 6 illustrates processor pulse trains showing alternating busy and idle periods for processor cores along a common time reference.

FIG. 6 is a high level schematic diagram 600 illustrating logical components and information flows involved in dynamically correlating the idle and busy periods across some or all processing cores. In the example illustrated in FIG. 6, a multiprocessor dynamic clock and voltage scaling (DCVS) driver 605 includes a polling component 635, a read statistical data component 640, a DCVS algorithm run block 645, and a performance update block 650. The DCVS driver 605 may wait for the occurrence of an event (e.g., an interrupt signal) to perform an analysis of the pulse train. In an aspect, events may include parameters, such as a transient timer expiration parameter, or a collection of a full event from a monitored core, or a collection of a nearly full event from a monitored core. A collection nearly full event may indicate that a buffer of pulses being collected by the kernel is nearly full and should be processed by user space to avoid overflow. Collection full event may indicate that a buffer of pulses being collected by the kernel has filled up and may start dropping pulses. Timer events may be used to perform periodic correlation based on the current window size. Other events may be passed that are part of the DCVS processing but are not related to correlation (e.g. input events).

Once awoken, the user space DCVS driver 605 may collect data needed to formulate a group/system wide frequency/voltage decision. This data may include at least one of a vector of time stamps, a time stamp for the start of each core busy period during the last query, a vector containing the duration of each busy period, and a vector containing the wait durations. In an aspect, the vector can be limited to a single pulse or even a single transition (from idle to busy or busy to idle) for each core. In an aspect, the wait duration is a time that a core is waiting on some external processing to occur. The terms "wait" and "idle" may refer to different operating states. For example, the term "idle" may refer to a state in which all the work that needs to be done is complete, and the core will not have more work to perform until an external event (e.g., a key press, or a timer expiration) occurs. The term "wait" may refer to a state in which that more work is left to be done, but cannot be started until some external processing has been completed (e.g., a CPU waiting for a GPU to render a frame). Also, the terms wait and idle may refer to either the actual state of the core or to an indication (e.g., a flag or state bit set in memory) of the state of the core.

Returning to FIG. 6, the user space DCVS driver 605 may include a polling block 635 in which the processor polls performance data. In block 640, statistical data may be read from the processor cores. Once the data is collected, the user space DCVS driver 605 may use the busy/idle/wait pulse trains to correlate busy/idle/wait activity across two or more of the processing cores to produce a consolidated pulse train that is unique for each of the processing cores. The consolidated pulse train may be used to set an individual performance level for each core while maintaining the desired performance levels.

In block 645, a consolidated DCVS algorithm may be executed, and the optimum performance level of the processor cores may be updated in block 650. In the zeroth CPU core (CPU Core 0) 610, the statistical data may be read, the DCVS statistical structure may be obtained, the performance (FD) data may be signaled as full, and a new performance level (i.e., voltage and/or frequency) may be applied to the core. Likewise, in the first CPU core (CPU Core 1) 615 and/or any of the other components 620-630, the statistical data may be read, the DCVS statistic structure may be obtained, the performance data may be signaled, and a new performance level may be applied to the core. This may be repeated or performed approximately simultaneously for all monitored processor cores. In an aspect, statistical data may be read by select components (e.g., components 610-630) in response to the user space DCVS driver 605 reading performance data from all of the monitored cores in block 640. In an aspect, the new performance level may be applied to the various processor cores in response to the user space DCVS driver 605 updating the optimum performance levels in block 650.

Figure 7A:
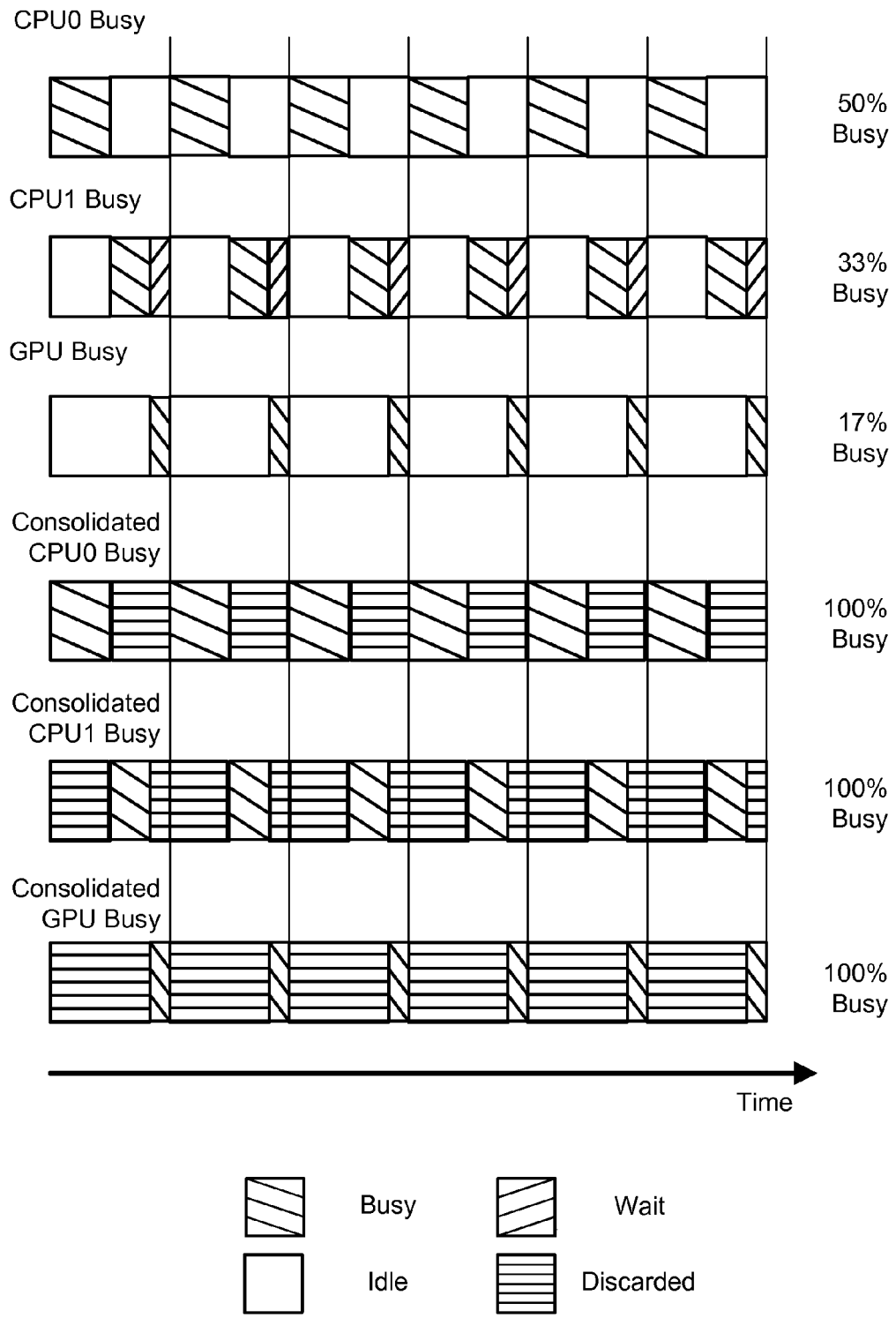
FIGS. 7A-B illustrate processor pulse trains of busy, idle, and wait periods along a common time reference.
Figure 7B:
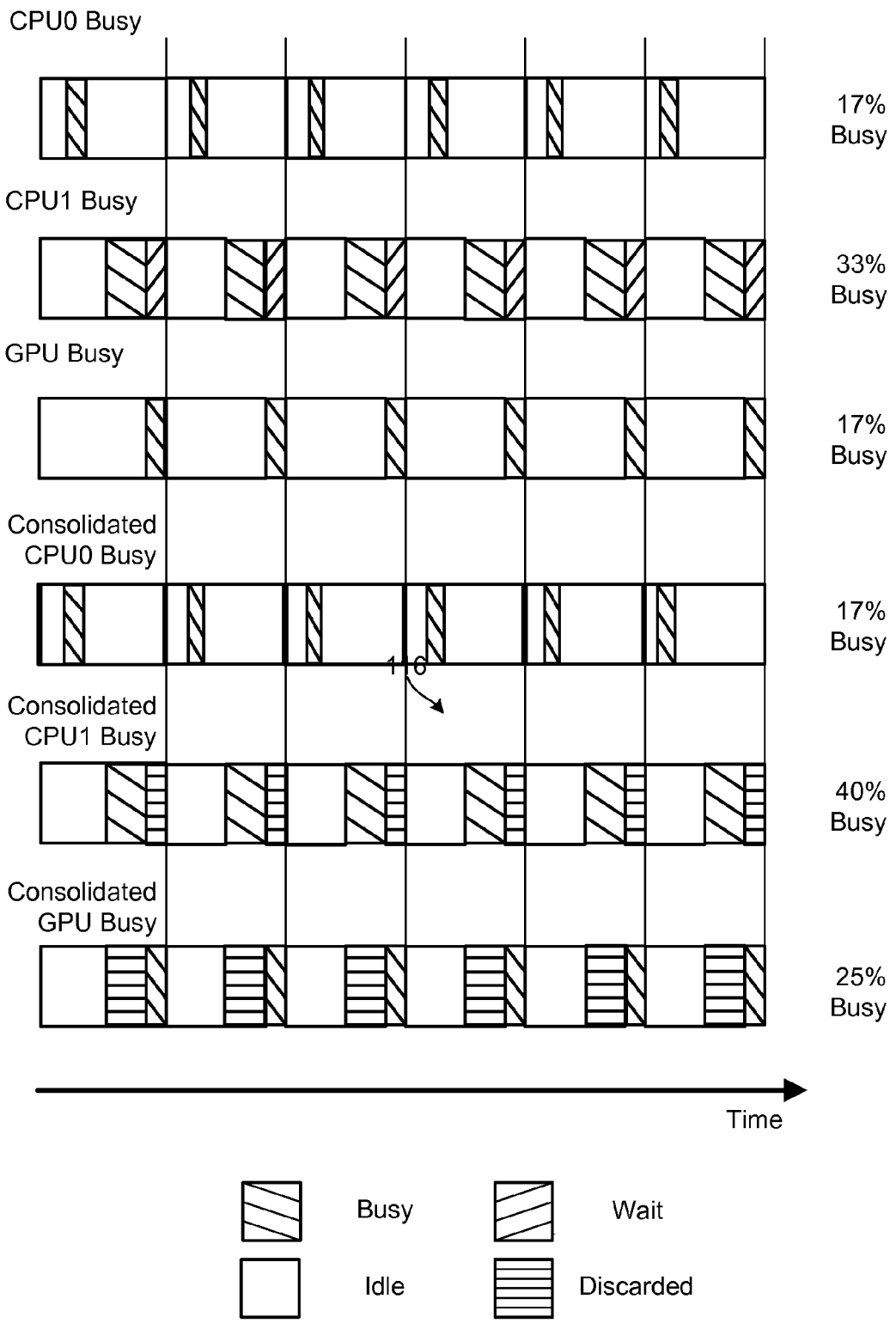

FIGS. 7A-B illustrate busy/idle states analyzed by the consolidated DCVS algorithm in a situation in which interdependent operations (either a single thread passing between two processor cores or multiple threads exhibiting interdependence between two processor cores) can be recognized based upon the pattern of busy and idle periods within pulse trains. As discussed above, existing DCVS solutions would view idle pulses in a single processor core and scale down the frequency/voltage of that processor core to save power without consideration of the impact on other processor cores within the system. This would result in power savings for the one processor core; however, the time required to complete busy pulses would be increased. The various aspects alleviate this problem by recognizing interdependent processes. For example, FIG. 7A illustrates that the alternating busy/idle states of CPU_0, CPU_1 and GPU processor cores suggest that whatever processes are going on in these cores are interdependent since overlaps or gaps between the alternating pulses are minimal when the pulse trains are viewed from a consolidated perspective. When such interdependent states are recognized, the consolidated DCVS algorithm generates consolidated DCVS pulse trains (Consolidated CPU0 Busy, Consolidated CPU1 Busy, Consolidated GPU Busy) for the interacting processor cores that reflect the interdependencies of the ongoing processes. By evaluating the opportunity for scaling down frequency/voltage based upon the consolidated pulse trains, the consolidated DCVS algorithm can scale the frequency/voltage for either or both of the interacting processor cores for the consolidated periods in a manner that is consistent with the work being accomplished by the cores.

FIG. 7B illustrates an example situation in which the CPU_0 and CPU_1 processor cores are operating independently (i.e., interdependency is not indicated). This is revealed by a pattern of pulse trains which feature overlapping idle periods, which occur when there is an overlap in the end of one busy period on a first processor core (CPU 0) with the start of the next busy period on another processor core (CPU 1). Overlapping idle periods (or busy periods) is one indication that the processes and operations occurring in each processor core are not interdependent or correlated to each other.

The absence of interdependence can be revealed in consolidated pulse trains (Consolidated CPU0 Busy, Consolidated CPU1 Busy, Consolidated GPU Busy) by the existence of consolidated idle periods, unlike the consolidated pulse trains of interdependent processes illustrated in FIG. 7A which have no or only brief idle periods. This illustrates how the frequency/voltage settings for each of the processor cores may be determined independently based upon the idle periods or busy-to-idle ratio observed in each processor core. The figures also illustrate how generating consolidated pulse trains may be used to adjust the frequency/voltage settings for individual processor cores dynamically to accommodate occasionally interdependent operations. In other words, the consolidated pulse trains may be used to adjust the frequency/voltage settings of individual processor cores in a manner that takes into account operations in one or more of the other processor cores. For example, using the consolidated pulse trains (Consolidated CPU0 Busy, Consolidated CPU1 Busy, Consolidated GPU Busy) the frequency/voltage setting for the CPU 0 processor core may be set higher than that of the GPU processor core due to the difference in idle durations.

The various aspects may be implemented within a system configured to steer threads to CPUs based on workload characteristics and a mapping to determine CPU affinity of a thread. A system configured with the ability to steer threads to CPUs in a multiple CPU cluster based upon each thread's workload characteristics may use workload characteristics to steer a thread to a particular CPU in a cluster. Such a system may steer threads to CPUs based on workload characteristics such as CPI (Clock cycles Per Instruction), number of clock cycles per busy period, the number of L1 cache misses, the number of L2 cache misses, and the number of instructions executed. Such a system may also cluster threads with similar workload characteristics onto the same set of CPUs.

In an aspect, the consolidated DCVS algorithm may be executed on any core processor which first begins or is triggered to initiate a DCVS process. Thus, any processor core in a multi-core system may initiate and control the consolidated DCVS algorithm.

In an aspect, the DCVS methods may be extended to include a virtualized busy/idle/wait pulse trains.

Figure 8:
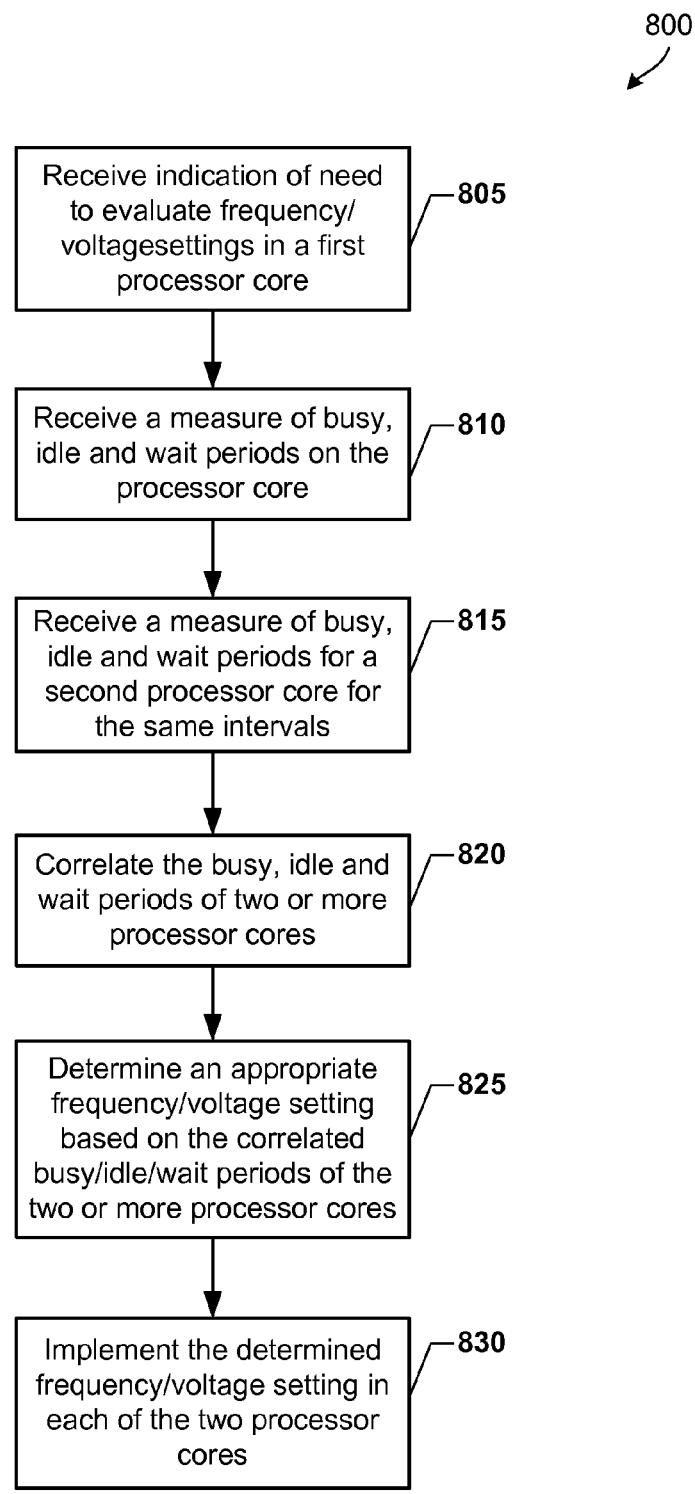
FIG. 8 is a process flow diagram of an aspect method implementable on any of a plurality of processor cores for determining appropriate frequency/voltage settings for two or more processor cores based on the correlated busy and idle periods of two or more processor cores.

FIG. 8 illustrates an aspect method 800 for determining a consolidated frequency/voltage setting for each of two processor cores by correlating busy, idle, wait, time and/or frequency of the two or more processor cores, with the consolidated DCVS algorithm being performed in the first processor core detecting an opportunity for adjusting the frequency/voltage settings. In method 800 at block 805, an indication may be received of a need to evaluate a frequency or voltage setting in a first processor core. This indication may be detection of an event or trigger which may be tied to an idle or wait duration or an idle-to-busy duty cycle value exceeding a predetermined threshold. In block 810, that processor core may obtain a measure of busy, idle, wait, time and/or frequency occurring in the processor core over a predefined preceding period of time. In block 815, the processor core may request measures of the busy, idle, wait, time and/or frequency from one or more other processor cores, and receives that busy, idle, wait, time and/or frequency information for the same analysis interval in a synchronized manner (i.e., with the busy, idle, wait, time and/or frequency information time stamped to enable time synchronized correlations).

In block 820, the busy, idle, the consolidated DCVS algorithm running in the first processor core may correlate wait, time and/or frequency of the two or more processor cores. In block 825, an appropriate frequency/voltage setting for two or more of the processor cores may be determined based on the correlated busy, idle, wait, time and/or frequency periods of the two or more processor cores. In block 830, the determined frequency/voltage settings may be implemented in each of the two processor cores.

The various aspects provide a number of benefits, and may be implemented in laptops and other mobile devices where energy is limited to improve battery life. The various aspects may also be implemented in quiet computing settings, and to decrease energy and cooling costs for lightly loaded machines Reducing the heat output allows the system cooling fans to be throttled down or turned off, reducing noise levels, and further decreasing power consumption. The various aspects may also be used for reducing heat in insufficiently cooled systems when the temperature reaches a certain threshold.

While the various embodiments are described above for illustrative purposes in terms of first and second processor cores, the embodiment methods, systems, and executable instructions may be implemented in multiprocessor systems that include more than two cores. In general, the various embodiments may be implemented in systems that include any number of processor cores in which the methods enable recognition of and controlling of frequency or voltage based upon correlations among any of the cores. In such embodiments, the operations of receiving sets of information from each processor core regarding frequency, time, busy periods, idle periods, and/or wait periods is performed for each of the processor cores, and correlating the information sets to identify interdependence relationships is performed among any combination of the processor cores. In such embodiments, the operations of scaling the frequency or voltage may be performed on each of the processor cores.

Figure 9:
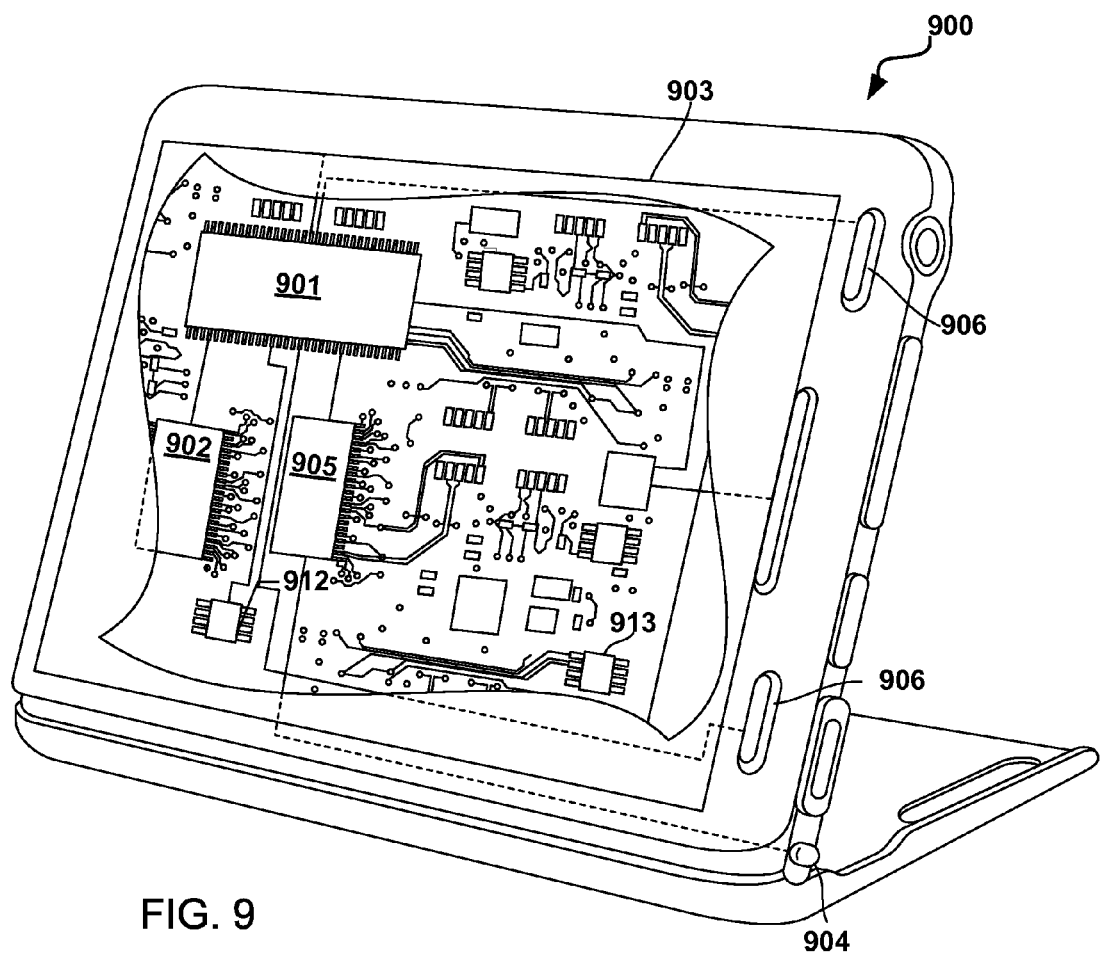
FIG. 9 is a component block diagram of a mobile device suitable for use in an aspect.

The various aspects may be implemented in a variety of mobile computing devices, an example of which is illustrated in FIG. 9. The mobile computing device 900 may include a multi-core processor 901 coupled to memory 902 and to a radio frequency data modem 905. The multi-core processor 901 may include circuits and structure similar to those described above and illustrated in FIGS. 1-3. The modem 905 may also include multiple processor cores, and may be coupled to an antenna 904 for receiving and transmitting radio frequency signals. The computing device 900 may also include a display 903 (e.g., touch screen display), user inputs (e.g., buttons) 906, and a tactile output surface, which may be positioned on the display 903 (e.g., using E-Sense™ technology), on a back surface 912, or another surface of the mobile device 900.

The mobile device processor 901 may be any programmable multi-core microprocessor, microcomputer or multiple processor chips that can be configured by software instructions (applications) to perform a variety of functions, including the functions and operations of the various aspects described herein.

Typically, software applications may be stored in the internal memory 902 before they are accessed and loaded into the processor 901. In some mobile computing devices, additional memory chips (e.g., a Secure Data (SD) card) may be plugged into the mobile device and coupled to the processor 901. The internal memory 902 may be a volatile or nonvolatile memory, such as flash memory, or a mixture of both. For the purposes of this description, a general reference to memory refers to all memory accessible by the processor 901, including internal memory 902, removable memory plugged into the mobile device, and memory within the processor 901.

Figure 10:
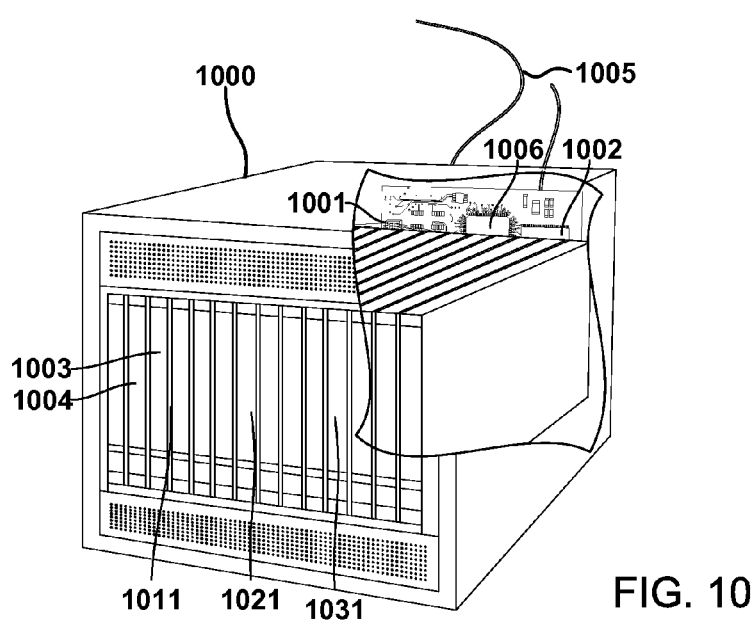
FIG. 10 is a component block diagram of a server device suitable for use in an aspect.

The various aspects may also be implemented on any of a variety of commercially available server devices, such as the server 1000 illustrated in FIG. 10. Such a server 1000 typically includes a processor 1001, and may include multiple processor systems 1011, 1021, 1031, one or more of which may be or include multi-core processors. The processor 1001 may be coupled to volatile memory 1002 and a large capacity nonvolatile memory, such as a disk drive 1003. The server 1000 may also include a floppy disc drive, compact disc (CD) or DVD disc drive 1006 coupled to the processor 1001. The server 1000 may also include network access ports 1004 coupled to the processor 1001 for establishing data connections with a network 1005, such as a local area network coupled to other broadcast system computers and servers. The processors 901, 1001 may be any programmable microprocessor, microcomputer or multiple processor chip or chips that can be configured by software instructions (applications) to perform a variety of functions, including the functions of the various aspects described above. In some devices, multiple processors 901, 1001 may be provided, such as one processor dedicated to wireless communication functions and one processor dedicated to running other applications. Typically, software applications may be stored in the internal memory 902, 1002, and 1003 before they are accessed and loaded into the processor 901, 1001.

Figure 11:
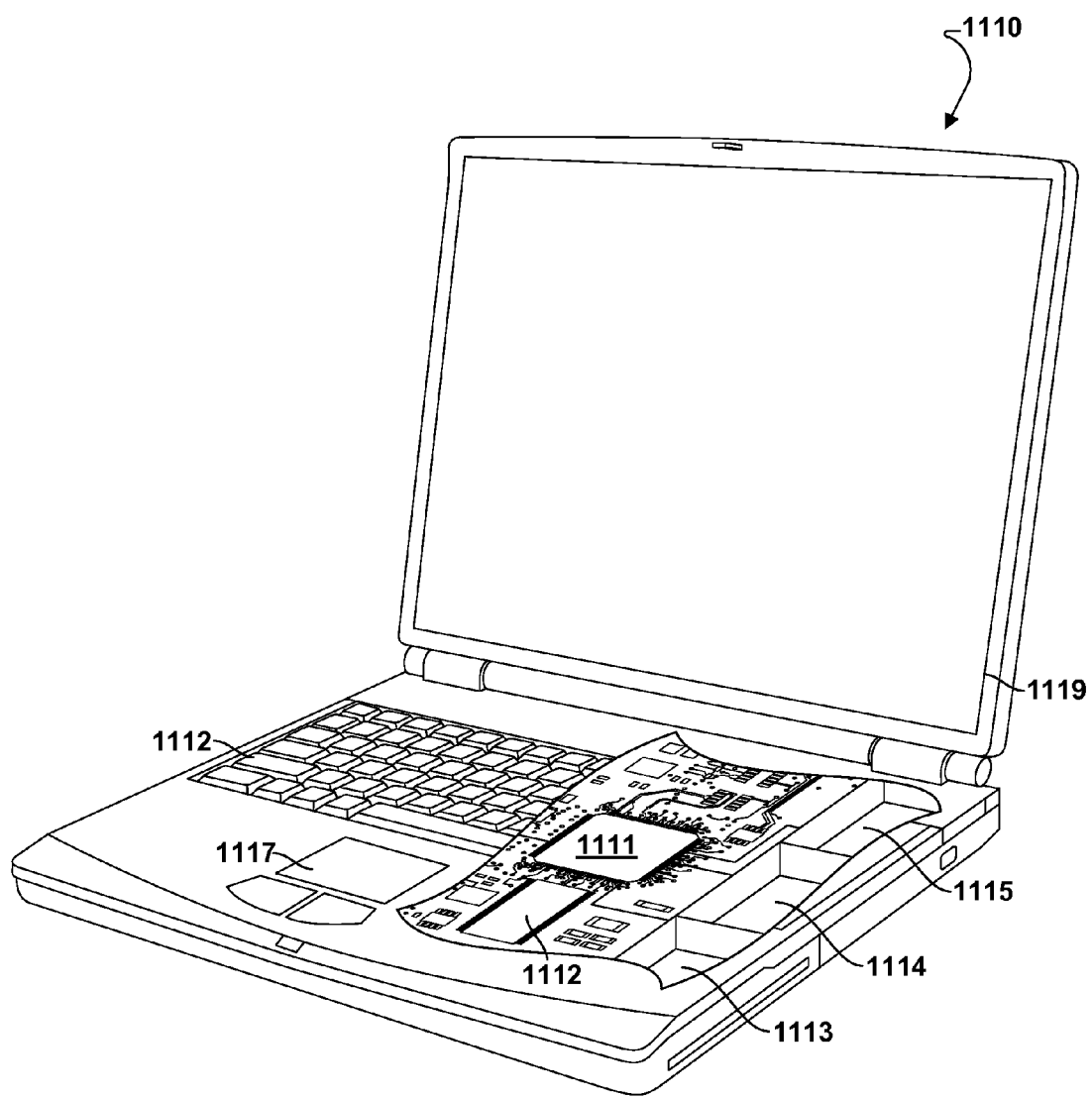
FIG. 11 is a component block diagram of a laptop computer device suitable for use in an aspect.

The aspects described above may also be implemented within a variety of personal computing devices, such as a laptop computer 1110 as illustrated in FIG. 11. A laptop computer 1110 may include a multi-core processor 1111 coupled to volatile memory 1112 and a large capacity nonvolatile memory, such as a disk drive 1113 of Flash memory. The computer 1110 may also include a floppy disc drive 1114 and a compact disc (CD) drive 1115 coupled to the processor 1111. The computer device 1110 may also include a number of connector ports coupled to the multi-core processor 1110 for establishing data connections or receiving external memory devices, such as a USB or FireWire® connector sockets, or other network connection circuits for coupling the multi-core processor 1111 to a network. In a notebook configuration, the computer housing includes the touchpad 1117, the keyboard 1118, and the display 1119 all coupled to the multi-core processor 1111. Other configurations of computing device may include a computer mouse or trackball coupled to the processor (e.g., via a USB input) as are well known.

The processor 901, 1001, 1110 may include internal memory sufficient to store the application software instructions. In many devices the internal memory may be a volatile or nonvolatile memory, such as flash memory, or a mixture of both. For the purposes of this description, a general reference to memory refers to memory accessible by the processor 901, 1001, 1110 including internal memory or removable memory plugged into the device and memory within the processor 901, 1001, 1110 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium. The steps of a method or algorithm disclosed herein may be embodied in a processor-executable software module which may reside on a tangible or non-transitory computer-readable storage medium. Non-transitory computer-readable storage media may be any available storage media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of performing dynamic clock and voltage scaling on a multiprocessor system having two or more processor cores, the method comprising:
    receiving a first set of information from a first processor core, the first information set including information regarding at least one of a frequency, time, busy periods, idle periods and wait periods of the first processor core;
    receiving a second set of information from a second processor core, the second information set including information regarding at least one of a frequency, time, busy periods, idle periods and wait periods of the second processor core;
    synchronizing the first and second information sets;
    correlating the synchronized first and second information sets to identify an interdependence relationship between operations of the first processor core and operations of the second processor core; and
    scaling the frequency or a voltage of the first processor core and scaling the frequency or a voltage of the second processor core according to a correlated information set when an interdependence relationship is identified between the operations of the first processor core and the operations of the second processor core, wherein scaling the frequency or the voltage of the first processor core and scaling the frequency or the voltage of the second processor core according to the correlated information set comprises:
        determining an appropriate frequency or voltage for the first processor core and an appropriate frequency or voltage for the second processor core according to the correlated information set; and
        adjusting the frequency or the voltage of the first processor core and the frequency or the voltage of the second processor core based on the determined appropriate frequency or voltage for the first processor core and the determined appropriate frequency or voltage for the second processor core.

2. The method of claim 1, further comprising scaling the frequency or the voltage of the first processor core and the frequency or the voltage of the second processor core independently when no interdependence relationship is identified between the operations of the first processor core and the operations of the second processor core.

3. The method of claim 1, wherein the multiprocessor system comprises more than two processor cores, and correlating the synchronized first and second information sets to identify a relationship between the operations of the first processor core and the operations of the second processor core comprises:
    correlating information sets among any combination of the processor cores; and
    scaling a frequency or a voltage of the processor cores according to any one or more of correlated information sets among any combination of the processor cores.

4. The method of claim 1, wherein correlating the synchronized first and second information sets to identify a relationship between the operations of the first processor core and the operations of the second processor core comprises identifying a relationship in which the first processor core is busy when the second processor core is idle.

5. The method of claim 1, wherein correlating the synchronized first and second information sets to identify a relationship between the operations of the first processor core and the operations of the second processor core comprises identifying a relationship in which the first processor core is idle when the second processor core is busy.

6. The method of claim 1, wherein correlating the synchronized first and second information sets to identify a relationship between the operations of the first processor core and the operations of the second processor core comprises overlaying a first busy pulse train on a second busy pulse train.

7. The method of claim 1, wherein:
the first and second information sets comprise pulse trains selected from one of a busy pulse train, an idle pulse train, and a wait pulse train; and
synchronizing the first and second information sets comprises synchronizing a first pulse train with a second pulse train.

8. The method of claim 7, wherein a single thread executing on the multiprocessor system performs the dynamic clock and voltage scaling operations.

9. The method of claim 7, wherein correlating the synchronized first and second information sets to identify a relationship between the operations of the first processor core and the operations of the second processor core comprises producing a consolidated pulse train for each of the first and the second processor cores.

10. The method of claim 9, wherein correlating the synchronized first and second information sets to identify a relationship between the operations of the first processor core and the operations of the second processor core further comprises using the consolidated pulse train for each of the first and the second processor cores to determine a performance level of each of the first and second processor cores independently.

11. A computing device, comprising:
a memory; and
two or more processor cores coupled to the memory, wherein at least one of the processor cores is configured with processor-executable instructions to cause the computing device to perform operations comprising:
receiving a first set of information from a first processor core, the first information set including information regarding at least one of a frequency, time, busy periods, idle periods and wait periods of the first processor core;
receiving a second set of information from a second processor core, the second information set including information regarding at least one of a frequency, time, busy periods, idle periods and wait periods of the second processor core;
synchronizing the first and second information sets;
correlating the synchronized first and second information sets to identify an interdependence relationship between operations of the first processor core and operations of the second processor core; and
scaling the frequency or a voltage of the first processor core and scaling the frequency or a voltage of the second processor core according to a correlated information set when an interdependence relationship is identified between the operations of the first processor core and the operations of the second processor core, wherein scaling the frequency or the voltage of the first processor core and scaling the frequency or the voltage of the second processor core according to the correlated information set comprises:
determining an appropriate frequency or voltage for the first processor core and an appropriate frequency or voltage for the second processor core according to the correlated information set; and
adjusting the frequency or the voltage of the first processor core and the frequency or the voltage of the second processor core based on the determined appropriate frequency or voltage for the first processor core and the determined appropriate frequency or voltage for the second processor core.

12. The computing device of claim 11, wherein at least one of the processor cores is configured with processor-executable instructions to cause the computing device to perform operations further comprising scaling the frequency or the voltage of the first processor core and the frequency or the voltage of the second processor core independently when no interdependence relationship is identified between the operations of the first processor core and the operations of the second processor core.

13. The computing device of claim 11, wherein at least one of the processor cores is configured with processor-executable instructions such that correlating the synchronized first and second information sets to identify a relationship between the operations of the first processor core and the operations of the second processor core comprises identifying a relationship in which the first processor core is busy when the second processor core is idle.

14. The computing device of claim 11, wherein at least one of the processor cores is configured with processor-executable instructions such that correlating the synchronized first and second information sets to identify a relationship between the operations of the first processor core and the operations of the second processor core comprises identifying a relationship in which the first processor core is idle when the second processor core is busy.

15. The computing device of claim 11, wherein at least one of the processor cores is configured with processor-executable instructions such that correlating the synchronized first and second information sets to identify a relationship between the operations of the first processor core and the operations of the second processor core comprises overlaying a first busy pulse train on a second busy pulse train.

16. The computing device of claim 11, wherein the computing devices comprises more than two processor cores, and wherein at least one of the processor cores is configured with processor-executable instructions to perform operations such that correlating the synchronized first and second information sets to identify a relationship between the operations of the first processor core and the operations of the second processor core comprises:
correlating information sets among any combination of the processor cores; and
scaling a frequency or a voltage of the processor cores according to any one or more of correlated information sets among any combination of the processor cores.

17. The computing device of claim 11, wherein at least one of the processor cores is configured with processor-executable instructions to cause the computing device to perform operations such that:
the first and second information sets comprise pulse trains selected from one of a busy pulse train, an idle pulse train, and a wait pulse train; and
synchronizing the first and second information sets comprises synchronizing a first pulse train with a second pulse train.

18. The computing device of claim 17, wherein at least one of the processor cores is configured with processor-executable instructions such that a single thread executing on the computing device performs the dynamic clock and voltage scaling operations.

19. The computing device of claim 17, wherein at least one of the processor cores is configured with processor-executable instructions such that correlating the synchronized first and second information sets to identify a relationship between the operations of the first processor core and the operations of the second processor core comprises producing a consolidated pulse train for each of the first and the second processor cores.

20. The computing device of claim 19, wherein at least one of the processor cores is configured with processor-executable instructions such that correlating the synchronized first and second information sets to identify a relationship between the operations of the first processor core and the operations of the second processor core further comprises using the consolidated pulse train for each of the first and the second processor cores to determine a performance level of each of the first and second processor cores independently.

21. A computing device, comprising:
means for receiving a first set of information from a first processor core, the first information set including information regarding at least one of a frequency, time, busy periods, idle periods and wait periods of the first processor core;
means for receiving a second set of information from a second processor core, the second information set including information regarding at least one of a frequency, time, busy periods, idle periods and wait periods of the second processor core;
means for synchronizing the first and second information sets;
means for correlating the synchronized first and second information sets to identify an interdependence relationship between operations of the first processor core and operations of the second processor core; and
means for scaling the frequency or a voltage of the first processor core and scaling the frequency or a voltage of the second processor core according to a correlated information set when an interdependence relationship is identified between the operations of the first processor core and the operations of the second processor core, wherein the means for scaling the frequency or the voltage of the first processor core and scaling the frequency or the voltage of the second processor core according to the correlated information set comprises:
means for determining an appropriate frequency or voltage for the first processor core and an appropriate frequency or voltage for the second processor core according to the correlated information set; and
means for adjusting the frequency or voltage of the first processor core and the frequency or the voltage of the second processor core based on the determined appropriate frequency or voltage for the first processor core and the determined appropriate frequency or voltage for the second processor core.

22. The computing device of claim 21, further comprising means for scaling the frequency or voltage of the first processor core and the frequency or the voltage of the second processor core independently when no interdependence relationship is identified between the operations of the first processor core and the operations of the second processor core.

23. The computing device of claim 21, wherein the computing devices comprises more than two processor cores, and wherein means for correlating the synchronized first and second information sets to identify a relationship between the operations of the first processor core and the operations of the second processor core comprises:
means for correlating information sets among any combination of the processor cores; and
means for scaling a frequency or a voltage of the processor cores according to any one or more of correlated information sets among any combination of the processor cores.

24. The computing device of claim 21, wherein means for correlating the synchronized first and second information sets to identify a relationship between the operations of the first processor core and the operations of the second processor core comprises means for identifying a relationship in which the first processor core is busy when the second processor core is idle.

25. The computing device of claim 21, wherein means for correlating the synchronized first and second information sets to identify a relationship between the operations of the first processor core and the operations of the second processor core comprises means for overlaying a first busy pulse train on a second busy pulse train.

26. The computing device of claim 21, further comprising means for selecting pulse trains such that the first and second information sets comprise pulse trains selected from one of a busy pulse train, an idle pulse train, and a wait pulse train, wherein means for synchronizing the first and second information sets comprises means for synchronizing a first pulse train with a second pulse train.

27. The computing device of claim 21, wherein means for correlating the synchronized first and second information sets to identify a relationship between the operations of the first processor core and the operations of the second processor core comprises means for identifying a relationship in which the first processor core is idle when the second processor core is busy.

28. The computing device of claim 27, further comprising means for executing a single thread on the computing device such that the single thread performs the dynamic clock and voltage scaling operations.

29. The computing device of claim 27, wherein means for correlating the synchronized first and second information sets to identify a relationship between the operations of the first processor core and the operations of the second processor core comprises means for producing a consolidated pulse train for each of the first and the second processor cores.

30. The computing device of claim 29, wherein means for correlating the synchronized first and second information sets to identify a relationship between the operations of the first processor core and the operations of the second processor core further comprises means for using the consolidated pulse train for each of the first and the second processor cores to determine a performance level of each of the first and second processor cores independently.

31. A non-transitory processor-readable storage medium having stored thereon processor-executable software instructions configured to cause a processor to perform operations for performing dynamic clock and voltage scaling on a multiprocessor system having two or more processor cores, the operations comprising:
receiving a first set of information from a first processor core, the first information set including information regarding at least one of a frequency, time, busy periods, idle periods and wait periods of the first processor core;
receiving a second set of information from a second processor core, the second information set including information regarding at least one of a frequency, time, busy periods, idle periods and wait periods of the second processor core;

synchronizing the first and second information sets;

correlating the synchronized first and second information sets to identify an interdependence relationship between operations of the first processor core and operations of the second processor core; and scaling the frequency or a voltage of the first processor core and scaling the frequency or a voltage of the second processor core according to a correlated information set when an interdependence relationship is identified between the operations of the first processor core and the operations of the second processor core, wherein scaling the frequency or the voltage of the first processor core and scaling the frequency or the voltage of the second processor core according to the correlated information set comprises:

determining an appropriate frequency or voltage for the first processor core and an appropriate frequency or voltage for the second processor core according to the correlated information set; and adjusting the frequency or the voltage of the first processor core and the frequency or the voltage of the second processor core based on the determined appropriate frequency or voltage for the first processor core and the determined appropriate frequency or voltage for the second processor core.

32. The non-transitory processor-readable storage medium of claim 31, wherein the stored processor-executable software instructions are configured to cause a processor to perform operations further comprising scaling the frequency or the voltage of the first processor core and the frequency or the voltage of the second processor core independently when no interdependence relationship is identified between the operations of the first processor core and the operations of the second processor core.

33. The non-transitory processor-readable storage medium of claim 31, wherein the stored processor-executable software instructions are configured to be executed on at least one processor core of a computing device comprising more than two processor cores, and the stored processor-executable software instructions are configured to cause the at least one processor core to perform operations such that correlating the synchronized first and second information sets to identify a relationship between the operations of the first processor core and the operations of the second processor core comprises:

correlating information sets among any combination of the processor cores; and scaling a frequency or a voltage of the processor cores according to any one or more of correlated information sets among any combination of the processor cores.

34. The non-transitory processor-readable storage medium of claim 31, wherein the stored processor-executable software instructions are configured to cause a processor to perform operations such that correlating the synchronized first and second information sets to identify a relationship between the operations of the first processor core and the operations of the second processor core comprises identifying a relationship in which the first processor core is busy when the second processor core is idle.

35. The non-transitory processor-readable storage medium of claim 31, wherein the stored processor-executable software instructions are configured to cause a processor to perform operations such that correlating the synchronized first and second information sets to identify a relationship between the operations of the first processor core and the operations of the second processor core comprises identifying a relationship in which the first processor core is idle when the second processor core is busy.

36. The non-transitory processor-readable storage medium of claim 31, wherein the stored processor-executable software instructions are configured to cause a processor to perform operations such that correlating the synchronized first and second information sets to identify a relationship between the operations of the first processor core and the operations of the second processor core comprises overlaying a first busy pulse train on a second busy pulse train.

37. The non-transitory processor-readable storage medium of claim 31, wherein the stored processor-executable software instructions are configured to cause a processor to perform operations such that:

the first and second information sets comprise pulse trains selected from one of a busy pulse train, an idle pulse train, and a wait pulse train; and synchronizing the first and second information sets comprises synchronizing a first pulse train with a second pulse train.

38. The non-transitory processor-readable storage medium of claim 37, wherein the stored processor-executable software instructions are configured to cause a processor to perform operations such that a single thread executing on the multiprocessor system performs the dynamic clock and voltage scaling operations.

39. The non-transitory processor-readable storage medium of claim 37, wherein the stored processor-executable software instructions are configured to cause a processor to perform operations such that correlating the synchronized first and second information sets to identify a relationship between the operations of the first processor core and the operations of the second processor core comprises producing a consolidated pulse train for each of the first and the second processor cores.

40. The non-transitory processor-readable storage medium of claim 39, wherein the stored processor-executable software instructions are configured to cause a processor to perform operations such that correlating the synchronized first and second information sets to identify a relationship between the operations of the first processor core and the operations of the second processor core further comprises using the consolidated pulse train for each of the first and the second processor cores to determine a performance level of each of the first and second processor cores independently.

* * * * *